United States Patent
Chisu et al.

(10) Patent No.: US 11,089,491 B2
(45) Date of Patent: Aug. 10, 2021

(54) OPTIMAL DEVICE POSITION FOR WIRELESS COMMUNICATION

(71) Applicant: Motorola Mobility LLC, Chicago, IL (US)

(72) Inventors: Daniel C. Chisu, Franklin Park, IL (US); Si Chen, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/696,756

(22) Filed: Nov. 26, 2019

(65) Prior Publication Data
US 2021/0160708 A1    May 27, 2021

(51) Int. Cl.
| | | |
|---|---|---|
| *H04W 24/00* | (2009.01) | |
| *H04W 24/02* | (2009.01) | |
| *H04W 76/10* | (2018.01) | |
| *H04W 4/02* | (2018.01) | |

(52) U.S. Cl.
CPC ........... *H04W 24/02* (2013.01); *H04W 4/026* (2013.01); *H04W 76/10* (2018.02)

(58) Field of Classification Search
CPC ..... H04W 4/029; H04W 64/00; H04W 24/10; H04W 4/33; H04W 84/12; H04W 88/08; H04W 12/06; H04W 16/18; H04W 16/28; H04W 24/08; H04W 36/0083; H04W 36/0094; H04W 36/20; H04W 36/30; H04W 4/021; H04W 4/023; H04W 4/44; H04W 64/003; H04W 72/048; H04W 72/085; H04W 84/042; H04W 8/18; H04W 8/24

USPC .......... 455/456.1, 420, 411, 436, 435.1, 566, 455/41.2, 525; 370/278
See application file for complete search history.

(56) References Cited

U.S. PATENT DOCUMENTS

| | | | |
|---|---|---|---|
| 8,140,076 B2 | 3/2012 | de Leon et al. | |
| 8,538,428 B2 | 9/2013 | Bartlett | |
| 8,570,914 B2* | 10/2013 | Sauer | H04W 4/33 370/278 |
| 8,649,800 B2 | 2/2014 | Kalliola et al. | |
| 8,761,684 B2* | 6/2014 | Reed | H04W 24/06 455/67.11 |
| 9,175,975 B2 | 11/2015 | Shtukater | |
| 9,729,819 B2* | 8/2017 | Im | G06F 3/011 |
| 9,749,069 B2 | 8/2017 | Garcia et al. | |

(Continued)

OTHER PUBLICATIONS

"Non-Final Office Action", U.S. Appl. No. 16/696,691, dated Apr. 9, 2020, 26 pages.

(Continued)

*Primary Examiner* — Joseph Arevalo
(74) *Attorney, Agent, or Firm* — FIG. 1 Patents

(57) ABSTRACT

Techniques for optimal device position for wireless communication are described, and may be implemented via a mobile device to identify an orientation in which to place a mobile device to achieve optimum wireless signal. Generally, the described techniques enable the mobile device to be dynamically calibrated for wireless communication by identifying signal attributes at multiple different device positions, and enabling the mobile device to be placed at a position that exhibits optimum wireless signal. Further, calibration can take into account multiple different antennas on the mobile device, and wireless signal attributes detected at each individual antenna.

20 Claims, 18 Drawing Sheets

(56) References Cited

U.S. PATENT DOCUMENTS

| | | |
|---|---|---|
| 9,749,607 B2 | 8/2017 | Boles et al. |
| 9,788,762 B2 | 10/2017 | Auerbach |
| 9,913,139 B2 | 3/2018 | Gross et al. |
| 10,015,769 B1* | 7/2018 | Younis .................. G01S 5/10 |
| 10,139,820 B2 | 11/2018 | Liu et al. |
| 10,168,695 B2 | 1/2019 | Barnickel et al. |
| 10,219,163 B2 | 2/2019 | Dzierwa et al. |
| 10,244,376 B1* | 3/2019 | Goto .................. H04N 1/00307 |
| 10,257,727 B2 | 4/2019 | Dzierwa et al. |
| 10,257,728 B2 | 4/2019 | Dzierwa et al. |
| 10,382,645 B2 | 8/2019 | Bai et al. |
| 10,405,203 B2* | 9/2019 | Soder .................. H04W 16/20 |
| 10,517,005 B2 | 12/2019 | Dzierwa et al. |
| 10,531,323 B2 | 1/2020 | Dzierwa et al. |
| 10,555,180 B2 | 2/2020 | Dzierwa et al. |
| 10,567,922 B2 | 2/2020 | Knebl et al. |
| 10,694,413 B2 | 6/2020 | Dzierwa et al. |
| 10,849,034 B1 | 11/2020 | Chisu et al. |
| 2012/0289241 A1 | 11/2012 | Kalliola et al. |
| 2014/0172296 A1 | 6/2014 | Shtukater |
| 2014/0273882 A1 | 9/2014 | Asrani et al. |
| 2014/0287806 A1 | 9/2014 | Balachandreswaran |
| 2015/0011273 A1* | 1/2015 | Wilmhoff .................. H04M 1/00 455/575.7 |
| 2015/0094037 A1 | 4/2015 | Jung |
| 2015/0094104 A1* | 4/2015 | Wilmhoff .................. H01Q 1/241 455/457 |
| 2015/0126217 A1* | 5/2015 | Do .................. G01S 5/0236 455/456.1 |
| 2015/0173022 A1 | 6/2015 | Black et al. |
| 2015/0230263 A1 | 8/2015 | Roy et al. |
| 2016/0235344 A1 | 8/2016 | Auerbach |
| 2016/0255604 A1* | 9/2016 | Venkatraman ........ H04W 64/00 455/456.1 |
| 2017/0013112 A1* | 1/2017 | Singhar .................. H04W 4/50 |
| 2017/0146990 A1* | 5/2017 | Wang .................. G05D 1/101 |
| 2017/0150371 A1 | 5/2017 | Cichonski |
| 2017/0238203 A1 | 8/2017 | Dzierwa et al. |
| 2017/0243138 A1 | 8/2017 | Dzierwa et al. |
| 2017/0243139 A1 | 8/2017 | Dzierwa et al. |
| 2018/0189971 A1* | 7/2018 | Hildreth ............. H04N 21/4781 |
| 2018/0276841 A1* | 9/2018 | Krishnaswamy .. G06K 9/00671 |
| 2018/0352111 A1 | 12/2018 | Bai et al. |
| 2019/0132748 A1* | 5/2019 | Guo .................. H04W 72/046 |
| 2019/0191313 A1 | 6/2019 | Dzierwa et al. |
| 2019/0230539 A1 | 7/2019 | Dzierwa et al. |
| 2019/0230541 A1 | 7/2019 | Dzierwa et al. |
| 2019/0246304 A1 | 8/2019 | Dzierwa et al. |
| 2019/0302216 A1* | 10/2019 | Hulvey .................. G01S 3/36 |
| 2019/0320292 A1 | 10/2019 | Knebl et al. |
| 2019/0327382 A1 | 10/2019 | Bai et al. |
| 2019/0356177 A1* | 11/2019 | Swan .................. H02J 7/025 |
| 2020/0014817 A1 | 1/2020 | Deshmukh et al. |
| 2020/0076064 A1* | 3/2020 | Alon .................. H01Q 3/28 |
| 2020/0106877 A1* | 4/2020 | Ledvina .................. H04W 4/026 |
| 2020/0128418 A1 | 4/2020 | Dzierwa et al. |
| 2020/0169892 A1 | 5/2020 | Dzierwa et al. |
| 2021/0044927 A1* | 2/2021 | Jia .................. H04W 4/026 |

OTHER PUBLICATIONS

"Notice of Allowance", U.S. Appl. No. 16/696,691, dated Jul. 17, 2020, 5 pages.

"How to Find Cell Phone Tower Locations Near Me?", Retrieved at: https://www.signalbooster.com/blogs/news/how-to-find-cell-tower-locations-near-me, Aug. 30, 2019, 10 pages.

Denisowski, "An Introduction to Radio Direction Finding Methodologies", Aug. 8, 2019, 99 pages.

* cited by examiner

US 11,089,491 B2

OPTIMAL DEVICE POSITION FOR WIRELESS COMMUNICATION

BACKGROUND

Wireless communication is ubiquitous and is used for a multitude of purposes, including wireless voice and data communication. Further, wireless protocols are constantly evolving to provide increased service levels for wireless users. For instance, recent developments in wireless technology have greatly increased the rate at which information can be transmitted wirelessly. One example of such a development is the 5G wireless cellular technology (e.g., 5G New Radio (NR)), which typically achieves higher data rates than previous wireless technologies. Such recently developed technologies achieve increased data rates at least in part by utilizing higher frequency wireless spectrum than previous technologies, such as 3.5 gigahertz (GHz) and higher. In fact, some implementations of these wireless technologies use extremely high frequency (EHF) frequencies, such as millimeter wave (mmWave) frequencies. While higher data rates can be achieved, such technologies exhibit a number of implementation challenges, such as increased directionality. Further, higher frequency wireless technologies can experience higher susceptibility to signal obstruction caused by physical interference, such as due to the presence of walls, furniture, human beings, and so forth.

BRIEF DESCRIPTION OF THE DRAWINGS

Aspects of optimal device position for wireless communication are described with reference to the following Figures. The same numbers may be used throughout to reference similar features and components that are shown in the Figures.

DETAILED DESCRIPTION

Figure 1:
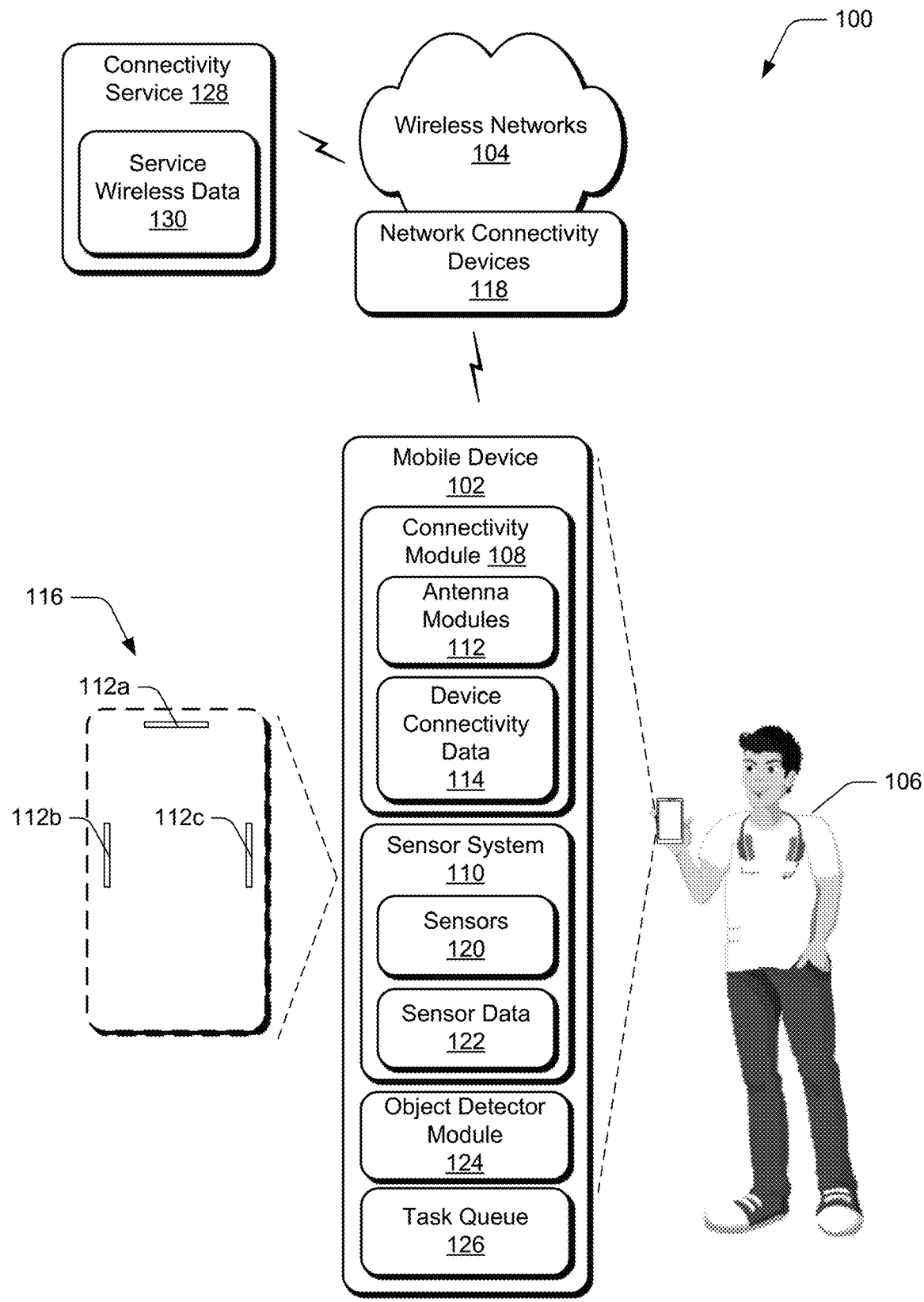
FIG. 1 illustrates an example environment in which aspects of optimal device position for wireless communication can be implemented.

Techniques for optimal device position for wireless communication are described, and may be implemented via a mobile device to identify an orientation in which to place a mobile device to achieve optimum wireless signal quality. Generally, the described techniques enable the mobile device to be calibrated for wireless communication by identifying wireless signal attributes at multiple different device positions (e.g., signal strength and signal quality), and enabling the mobile device to be placed at a position that exhibits optimum wireless signal performance. Further, calibration can take into account multiple different antennas on the mobile device, and wireless signal attributes detected at each individual antenna.

For instance, consider a scenario where a user carries a mobile device to a particular geographic location, such as the user's desk at their place of employment. To enable the mobile device to achieve wireless connectivity of optimal quality to a wireless network (e.g., a 5G NR wireless cellular network), the mobile device implements a calibration process for detecting wireless signal attributes at different device positions. The calibration process, for instance, invokes user participation to assist in manipulating the mobile device to different positions. For example, the mobile device presents a user prompt that includes guidance for manipulating the mobile device. The mobile device then gathers position data and wireless signal data at different positions, such as while a user manipulates the device to different positions. In a multi-antenna implementation, the wireless signal data can be gathered and tracked for each antenna to enable wireless signal attributes to be characterized for each antenna and at each different position. The mobile device then aggregates the position data and wireless signal data to generate a signal map that identifies different locations, device positions at the locations, and wireless signal attributes identified at each position.

Based on the signal map, the mobile device identifies an optimal position that exhibits optimum signal quality, and implements an optimization process for enabling the mobile device to be placed at the optimal position. The mobile device, for instance, outputs a user prompt with guidance for placing the mobile device at the optimal position. A user can then manipulate the mobile device based on the user prompt to the optimal position, such as via rotation and/or translational movement of the mobile device. The mobile device can engage in wireless communication at the optimal position, such for voice and data communication. In at least one implementation, certain wireless tasks can be queued in a task queue when the mobile device is located away from (e.g., not located at) the optimal position. Thus, in response to detecting that the mobile device is positioned at the optimal position, wireless tasks from the task queue can be performed. Generally, the various processes described herein may be performed dynamically and in real time, such as pursuant to end user interactions with a mobile device.

Accordingly, techniques described herein enable improved wireless communication for a mobile device by identifying wireless signal attributes at different device positions, and identifying those positions that exhibit optimum signal quality. This is particularly useful in assisting with wireless connectivity for technologies that utilize high frequency radio spectrum, such as 5G NR. Further, certain wireless tasks for a mobile device can be queued until the mobile device is detected at an optimal wireless position, at which point the wireless tasks from the queue can be performed. This helps in conserving device resources such as battery charge, processor bandwidth, and memory usage.

The described techniques are also able to utilize a signal map for making various decisions pertaining to wireless connectivity of a mobile device. For instance, in a scenario where a scan event occurs for a mobile device (e.g., an idle scan event), the signal map can be queried to determine if a wireless signal source of acceptable signal quality is available to provide wireless connectivity to the mobile device. The signal map, for instance, tracks different locations (e.g., geographical locations), device orientations (e.g., 3D orientations) at the locations, and wireless signal attributes at the different locations/orientations. The wireless signal attributes, for instance, pertain to signal strength and/or signal quality of wireless signal detected from different wireless signal sources. Further, the wireless signal attributes can be utilized to generate a signal score that indicates a relative signal strength/signal quality of a particular wireless signal source. Accordingly, the signal map is queried with a location and orientation of the mobile device to determine if a wireless signal source is available for the location/orientation that meets a signal threshold, e.g., a minimum signal score. If such wireless signal source is identified in the signal map, the mobile device can perform a fast acquisition process for connecting to the wireless signal source. If the signal map does not identify a wireless signal source that meets the signal threshold, a general scan for an available wireless signal source can be performed. In at least some implementations, the signal map can be updated based on a result of the fast acquisition process and/or the general scan.

The signal map may also be utilized to manage handover events, such as when a mobile device determines that a wireless handover between different wireless signal sources is to occur. For instance, when a handover event is detected that identifies a target signal source for a handover of a mobile device, the signal map is queried with an identifier for the target signal source, along with a location/orientation of the mobile device to determine if the target signal source meets a signal threshold. If the target signal source meets the signal threshold (e.g., is identified as an optimal signal source at the location/orientation), the handover proceeds to enable the mobile device to connect to the target signal source. However, if the target signal source does not meet the signal threshold, a scan for an available wireless signal source can be performed. The mobile device, for instance, can query the signal map with a location/orientation of the mobile device to determine if the signal map identifies a wireless signal source at the location/orientation (e.g., other than the target signal source for the handover) that meets the signal threshold. Based on whether the signal map identifies such a wireless signal source, the mobile device can perform a fast acquisition process for an identified wireless signal source, or perform a general scan for an available wireless signal source. Further, the signal map can be updated based on the results of a handover, a fast acquisition process, and/or a general scan.

Thus, the described techniques enable wireless signal quality for mobile devices to be optimized at different locations and orientations of the mobile device. For instance, by utilizing a signal map to track wireless signal attributes (e.g., wireless signal quality) of different wireless signal sources at different locations and orientations of a mobile device, the described techniques enable the mobile device to connect to signal sources that provide optimal wireless signal, while avoiding signal sources that may provide less than optimal wireless signal.

While features and concepts of optimal device position for wireless communication can be implemented in any number of different devices, systems, environments, and/or configurations, aspects of optimal device position for wireless communication are described in the context of the following example devices, systems, and methods.

FIG. 1 illustrates an example environment 100 in which aspects of optimal device position for wireless communication can be implemented. The example environment 100 includes a mobile computing device ("mobile device") 102 that is connectable to wireless networks 104. In this particular example, the mobile device 102 represents a portable device that can be carried by a user 106, such as a smartphone, a tablet device, a laptop, a wearable computing device, (e.g., a smartwatch or a fitness tracker), and so forth. These examples are not to be construed as limiting, however, and the mobile device 102 can be implemented in a variety of different ways and form factors. Further example attributes of the mobile device 102 are discussed below with reference to the device 1700 of FIG. 17.

The mobile device 102 includes various functionality that enables the mobile device 102 to perform different aspects of optimal device position for wireless communication discussed herein, including a connectivity module 108 and a sensor system 110. The connectivity module 108 represents functionality (e.g., hardware and logic) that enables the mobile device 102 to communicate wirelessly, such as for wireless data and voice communication. The connectivity module 108, for instance, includes functionality to support different wireless protocols, such as wireless cellular (e.g., 3G, 4G, 5G), wireless broadband, Wireless Local Area Network (WLAN) (e.g., Wi-Fi), Wi-Fi Direct, Neighborhood Awareness Networking (NAN), wireless short distance communication (e.g., Bluetooth™ (including Bluetooth™ Low Energy (BLE)), Near Field Communication (NFC)), and so forth. The connectivity module 108 also includes antenna modules 112 and device connectivity data ("device data") 114.

The antenna modules 112 represent functionality (e.g., hardware and logic) for enabling the mobile device 102 to send and receive wireless signal, such as for wireless connectivity to the wireless networks 104. At least some individual antenna modules 112, for instance, each include a physical antenna device that is operable to receive wireless signal transmitted by the wireless networks 104, and to transmit wireless signal for receipt by the wireless networks 104. The antenna modules 112 may include other hardware and logic, for as for adapting operating parameters of physical antennas. In at least one implementation, at least some of the antenna modules 112 represent antennas without integrated logic, such as patch antennas and/or arrays of antennas that are communicatively connected to the connectivity module 108. In at least some implementations, the mobile device 102 may employ instances of the antenna modules 112 physically arranged at different locations on the mobile device 102, such as to optimize wireless performance of the mobile device 102.

For instance, the environment 100 depicts an internal view 116 that represents a view of the mobile device 102 with a surface removed, such as a display screen of the mobile device 102. Depicted in the internal view 116 is an antenna module 112a, antenna module 112b, and antenna module 112c, which represent different instances of the antenna modules 112. As shown, the antenna modules 112a-112c are each positioned at different physical locations on the mobile device 102. Further, the antenna modules 112a-112c are interconnected to provide an integrated antenna structure for enabling the mobile device to send and receive wireless signal. This particular arrangement of antenna modules 112 is presented for purpose of example only, and it is to be appreciated that the described implementations can utilize a variety of different arrangements of antennas not expressly described herein.

The mobile device 102 generates and/or maintains the device data 114, which is representative of various types of data that is used and/or observed by the connectivity module 108. The device data 114, for instance, includes attributes of wireless signal received and/or detected by the connectivity module 108, such as base station identifiers, received signal strength indicator (RSSI), signal strength (e.g., in dBm), signal frequency band, signal quality (e.g., signal-to-noise (S/N) ratio), and so forth. The device data 114 also includes position information pertaining to various locations and orientations of the mobile device 102, such as described in more detail below.

In at least one implementation, the connectivity module 108 wirelessly connects the mobile device 102 to the wireless networks 104 via interaction between the connectivity module 108 and network connectivity devices 118. Generally, the network connectivity devices 118 are representative of functionality to receive and transmit wireless signal and serve as access portals for the wireless networks 104. Examples of the network connectivity devices 118 include a wireless cellular base station, a wireless access point (e.g., for a WLAN and/or a Wireless Wide Area Network (WWAN)), a short-range wireless network access point, and so forth. In at least one implementation, instances of the network connectivity devices 118 include 5G next-generation base transceiver station devices (e.g., gNodeB (gNB) stations) that are operable to connect the mobile device 102 to a 5G mobile network accessible via the wireless networks 104. In at least one implementation, the network connectivity device 118 and/or the wireless networks represent wireless signal sources for the mobile device 102.

The sensor system 110 is representative of functionality to detect various physical and/or logical phenomena in relation to the mobile device 102, such as motion, light, image detection and recognition, time and date, position, location, touch detection, temperature, and so forth. To enable the sensor system 110 to detect such phenomena, the sensor system 110 includes sensors 120 that are configured to generate sensor data 122. Examples of the sensors 120 include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In at least some implementations, the sensor data 122 represents raw sensor data collected by the sensors 120. Alternatively or in addition, the sensor data 122 represents raw sensor data from the sensors 120 that is processed to generate processed sensor data, such as sensor data from multiple sensors 120 that is combined to provide more complex representations of mobile device 102 state than can be provided by a single sensor 120.

The mobile device 102 further includes an object detector module 124 and a task queue 126. The object detector module 124 is representative of functionality to detect physical objects that are in proximity to the mobile device 102. The object detector module 124, for instance, leverages the sensor system 110 for object detection. Generally, the object detector module 124 can utilize different detected phenomena to detect a physical object, such as light (e.g., via a camera), sound (e.g., via a microphone), temperature (e.g., via a thermal sensor), time of flight sensing, and so forth. As further detailed below, the connectivity module 108 can incorporate object detection into a process of characterizing wireless signal attributes at different positions of the mobile device 102.

The task queue 126 is representative of functionality to store and/or track different wireless-related tasks to be performed via the mobile device 102, such as wireless data downloads and/or uploads. For instance, when a wireless task to be performed via the mobile device 102 is generated, the wireless task can be placed into the task queue 126. In response to detecting that the mobile device 102 is positioned at an optimal position, the wireless task can be performed. Generally, this enables various resources of the mobile device 102 to be conserved, such as power and processing resources.

The environment 100 further includes a connectivity service 128 which is connected to and accessible via the wireless networks 104. The mobile device 102, for instance, can interact with the connectivity service 128 to obtain various connectivity-related information and services. For example, the connectivity service 128 includes service wireless data ("service data") 130, which represents various wireless connectivity-related data obtained by the connectivity service 128 in different ways. In at least one implementation, the service data 130 represents information about different wireless networks 104 and network connectivity devices 118 obtained from various sources, such as the mobile device 102. The service data 130, for instance, can include overlapping and/or identical information to the device data 114. Further details concerning how the service data 130 is obtained and utilized are discussed below.

Figure 2:
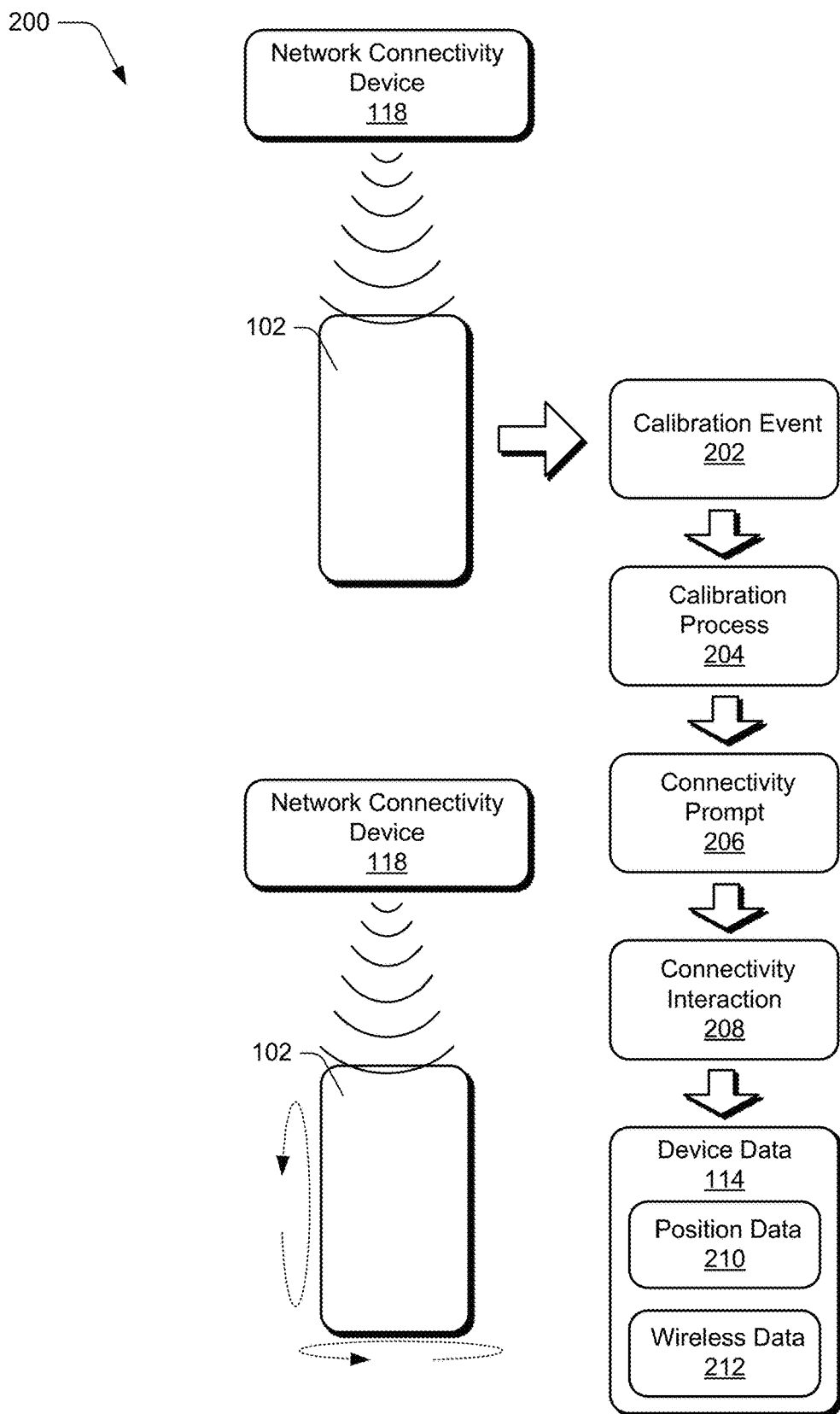
FIG. 2 depicts a scenario for initiating a wireless calibration process for a mobile device in accordance with one or more implementations.

FIGS. 2-7 depict different aspects of implementations for optimal device position for wireless communication. For instance, FIG. 2 depicts a scenario 200 for initiating a wireless calibration process for a mobile device. In the scenario 200, a calibration event 202 occurs indicating that the mobile device 102 is to calibrate its wireless connectivity. According to various implementations, the connectivity module 108 can detect the calibration event 202 based on different detected occurrences. For instance, the calibration event 202 occurs in response to the mobile device 102 connecting to the network connectivity device 118. The calibration event 202, for example, is based on the mobile device 102 negotiating for and connecting to a wireless network 104, such as a 5G wireless cellular network. In at least one implementation, for purposes of the following scenarios, the network connectivity device 118 represents a gNB of a 5G wireless cellular network. The calibration event 202 may alternatively or in addition indicate that the mobile device 102 is camped on the wireless network 104, such as for a threshold period of time. In yet another additional or alternative implementation, the calibration event 202 occurs in response to the mobile device 102 moving a threshold distance, such as between different geographical locations.

Based on the calibration event 202, the connectivity module 108 initiates a calibration process 204 for obtaining optimal wireless connectivity to the network connectivity device 118. As part of the calibration process 204, the connectivity module 108 generates and outputs a connectivity prompt 206 that requests that a user perform an action to assist in optimizing wireless connectivity of the mobile device 102. The connectivity prompt 206 may be output by the mobile device 102 using various output modalities, such as graphical, audio, and/or tactile. In at least one implementation, the connectivity prompt 206 includes an instruction to manipulate the mobile device 102 in various ways, such as to rotate the mobile device 102 in different directions relative to a user that is handling the mobile device.

Accordingly, the connectivity module 108 detects a connectivity interaction 208 that occurs based on user manipulation of the mobile device 102. The connectivity interaction 208 generally represents a physical movement of the mobile device 102, such as rotational and/or translational movement. Based on the connectivity interaction 208, position data 210 is generated that describes the connectivity interaction 208. The sensor system 110, for instance, generates the position data 210 based on movement detected by the sensors 120. The position data 210 can describe the connectivity interaction 208 in different ways, such as direction of movement, relative amount of movement, and orientation of the mobile device 102. The connectivity module 108 also generates wireless data 212 as part of (e.g., during) the connectivity interaction 208. The wireless data 212 includes data that describes various attributes of wireless signal exchanged (e.g., transmitted and/or received) between the mobile device 102 and the network connectivity device 118. For instance, the wireless data 212 describes attributes of wireless signal detected by the mobile device 102 at different positions indicated by the position data 210, such as wireless signal strength, signal quality, signal speed, and so forth. In at least one implementation, the wireless data 212 is based on wireless signal transmitted by the network connectivity device 118 and received at the mobile device 102. The position data 210 and the wireless data 212 are used to generate the device data 114.

Figure 3:
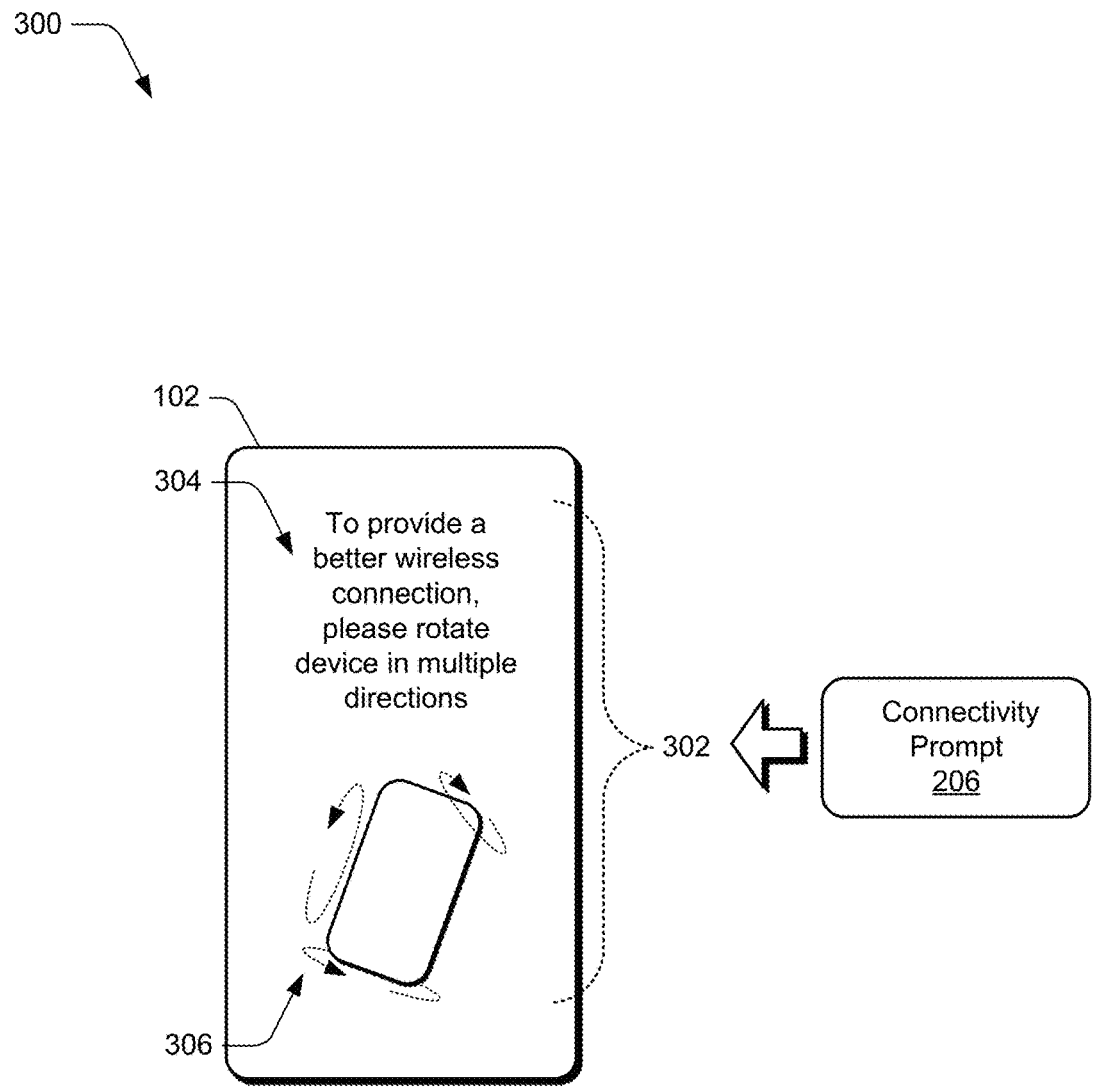
FIG. 3 depicts a scenario for outputting a connectivity prompt in accordance with one or more implementations.

FIG. 3 depicts a scenario 300 for outputting the connectivity prompt 206. In this example, the connectivity prompt 206 includes a graphical prompt 302 representing a visual prompt with user instructions for assisting in the calibration process 204. As depicted, the graphical prompt 302 includes text content 304 instructing the user to manipulate (e.g., rotate) the mobile device 102 in different directions. The graphical prompt 302 also includes a graphical depiction 306 of the user instructions, such as a graphical depiction of the requested movement of the mobile device 102. In one particular example, the graphical depiction 306 includes an animation that visually depicts the requested movement of the mobile device 102. Accordingly, as part of the connectivity interaction 208, a user may physically manipulate the mobile device 102 to attempt to simulate the movement depicted by the graphical depiction 306. Additionally or alternatively to the graphical prompt 302, the connectivity prompt 206 may include other output modalities, such as audio and/or tactile output.

Figure 4A:
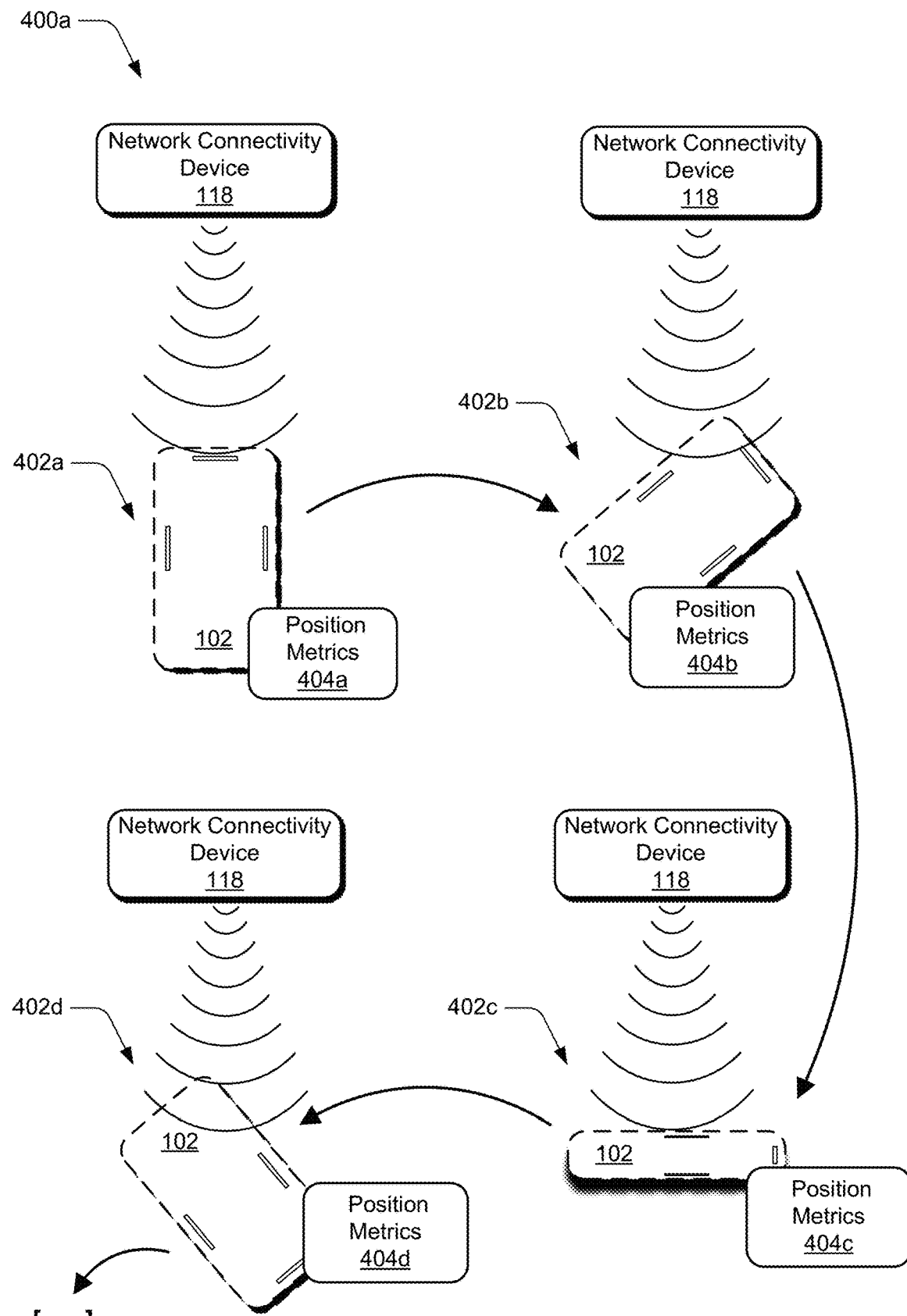
FIG. 4a depicts a scenario that details aspects of a calibration process in accordance with one or more implementations described herein.

FIG. 4a depicts a scenario 400a that details aspects of a calibration process. In the scenario 400a, a user manipulates the mobile device 102 in different directions relative to the network connectivity device 118 and as part of the connectivity interaction 208. The user, for instance, manipulates the mobile device 102 to a position 402a, then to a position 402b, to a position 402c, and to a position 402d. Placing the mobile device 102 in the different positions 402a-402d can involve various types of movement, such as rotational and/or translational movement of the mobile device 102 relative to the network connectivity device 118. In at least one implementation, the user 106 remains positioned at a single physical location while manipulating the mobile device to different positions 402a-402d, such as in an office, a conference room, a residential location, and so forth.

In conjunction with the movement of the mobile device 102 to the different positions, the connectivity module 108 generates the device data 114 and the sensor system 110 generates the sensor data 122. The connectivity module 108 then utilizes this data to generate position metrics 404 that correlate the device data 114 with the position data 210 at each position 402. For instance, for the position 402a, the connectivity module 108 generates position metrics 404a that describe a relative position of the mobile device 102 at the position 402a, and wireless signal attributes detected at the position 402a, e.g., signal strength and signal quality. The position metrics 402a can describe the position of the mobile device 102 in various ways, such as using GPS coordinates and 3D orientation of the mobile device 102 at the position 402a. In at least one implementation, 3D orientation can be specified relative to a gravity vector and described in terms of orientation in a 3D space, such as using x, y, z coordinates that describe a 3D orientation of the mobile device 102.

The position metrics 404a can describe wireless signal attributes experienced by the mobile device 102 at the position 402a and specifically with reference to each antenna module 112. For instance, the wireless signal attributes can describe wireless signal attributes (e.g., signal strength and signal quality) detected at each individual antenna module 112a-112c. As depicted, for example, the antenna module 112a is better positioned to directly receive wireless signal from the network connectivity device 118 than are the antenna modules 112b, 112c. Thus, the position metrics 404a may indicate that the antenna module 112a receives a higher strength and/or quality wireless signal than the antenna modules 112b, 112c.

The connectivity module 108 can further generate position metrics 404b for the position 402b, position metrics 404c for the position 402c, and position metrics 404d for the position 402d. Generally, each of the position metrics 404a-404d include device position information and wireless signal attributes at each of the respective positions 402a-402d. The particular device positions depicted in the scenario 400a are presented for purpose of example only, and it is to be appreciated that techniques described herein can leverage a variety of different device positions not expressly depicted.

Figure 4B:
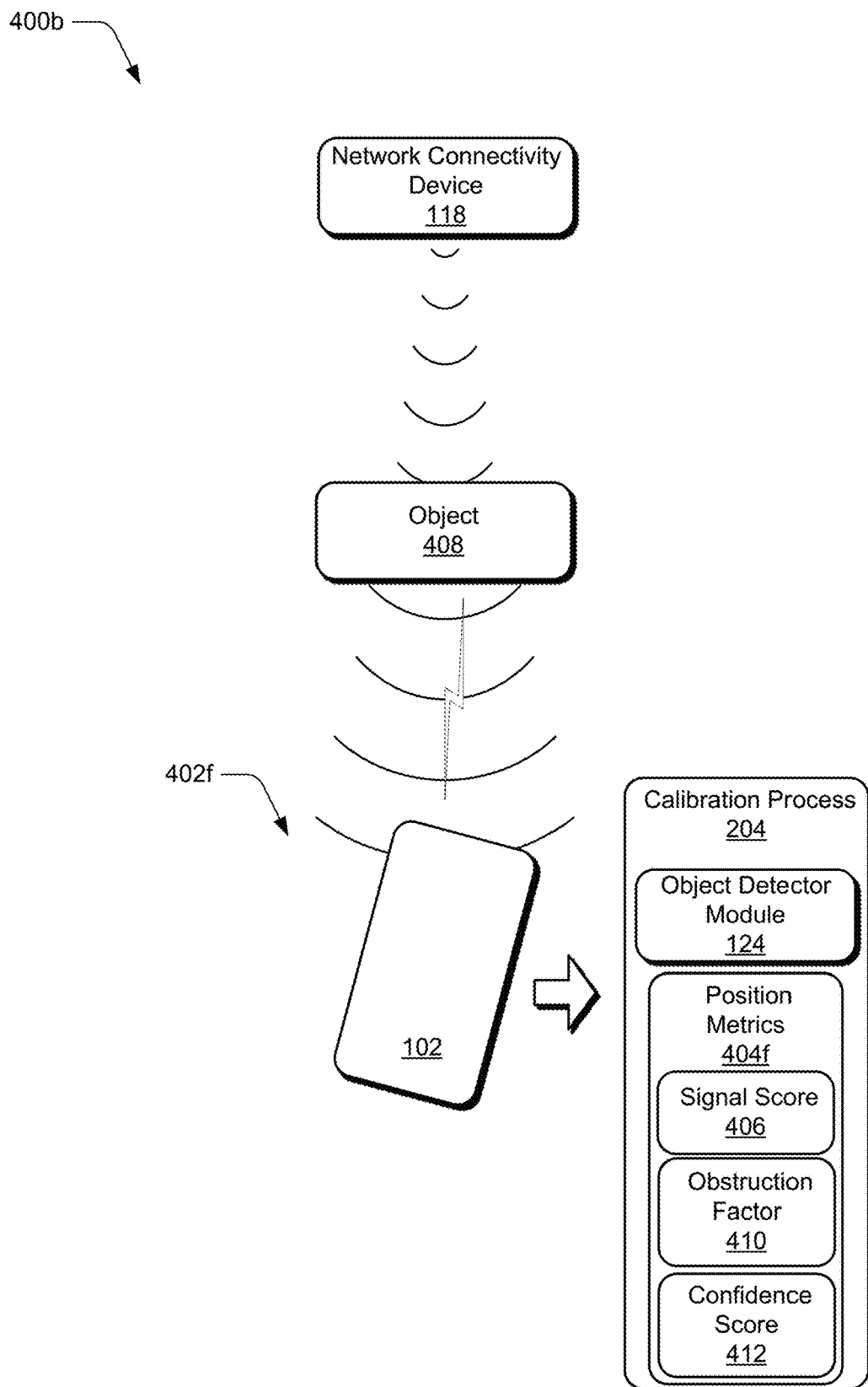
FIG. 4b depicts a scenario for incorporating a detected obstruction into a calibration process in accordance with one or more implementations described herein.

FIG. 4b depicts a scenario 400b for incorporating a detected obstruction into a calibration process. The scenario 400b, for instance, is implemented in conjunction with the calibration described herein, such as in the scenario 400a. In the scenario 400b, while the calibration process 204 is active, the user positions the mobile device 102 at a position 402f relative to the network connectivity device 118. In the position 402f, the connectivity module 108 detects wireless attributes of wireless signal received at mobile device 102 and generates position metrics 404f that describe the position 402f and attributes of wireless signal at the position 402f, e.g., wireless signal strength and quality. Further, the connectivity module 108 generates a signal score 406 that represents a combination of signal strength and signal quality for the position 402f. For instance, signal strength and signal quality can be quantified using any suitable quantification, and can be combined (e.g., summed) to generate the signal score 406. In at least one implementation, the higher the signal score 406, the better (e.g., more optimal) a particular device position for wireless communication.

Further to the scenario 400b, the object detector module 124 detects an object 408 that represents a physical object that at least partially obstructs wireless signal communicated between the mobile device 102 and the network connectivity device 118. The object 408 can represent various types and instances of physical objects, such as a biological entity (e.g., a person), furniture, a vehicle, and so forth.

During the calibration process 204, for instance, the object detector module 124 receives sensor data 122 from the sensor system 110, and monitors the sensor data 122 for indications of an obstruction that is positioned to interfere with wireless signal from the network connectivity device 118. Generally, the object detector module 124 can utilize different types of sensor data 122 for object detection, such as thermal data, camera data (e.g., image detection), time of flight (ToF) sensor data, and so forth. Accordingly, the object detector module 124 notifies the connectivity module 108 that the object 408 is present at a position to potentially interfere with wireless signal communicated between the mobile device 102 and the network connectivity device 118.

Accordingly, based on the notification of the object 408, the connectivity module 108 applies an obstruction factor 410 to the position metrics 404f. In at least one implementation, the obstruction factor 410 causes signal attribute information of the position metrics 404f to reflect that the object 408 was detected while wireless signal was communicated between the mobile device 102 and the network connectivity device 118. For instance, as part of the calibration process 204, the connectivity module 108 generates confidence scores for the different position metrics that indicate an estimated relative reliability of the position metrics. With reference to the position metrics 404f, for example, the connectivity module 108 generates a confidence score 412 that indicates an estimated reliability of the position metrics 404f. As one example, the confidence score 412 indicates a relative confidence that the signal score 406 is accurate. Accordingly, the connectivity module 108 applies the obstruction factor 410 to adjust (e.g., reduce) the confidence score 412. For instance, the obstruction factor 410 can represent a weighting value that can be applied to decrease the confidence score 412 for the position 402f. Generally, this reflects the notion that the object 408 may be temporary (e.g., a person or other movable object), and thus signal quality at the position 402f may increase when the obstruction is no longer present.

Alternatively or in addition to affecting the confidence score 412 for the position metrics 404f, the obstruction factor 410 can be used to tag the position metrics 404f as being generated in the presence of an obstruction. Thus, when the mobile device 102 is again detected at the position 402f, the connectivity module 108 can leverage the object detector module 124 to determine if an obstruction is present and if not, the connectivity module 108 can collect further wireless signal quality data and update the position metrics 404f with the further data.

Figure 5:
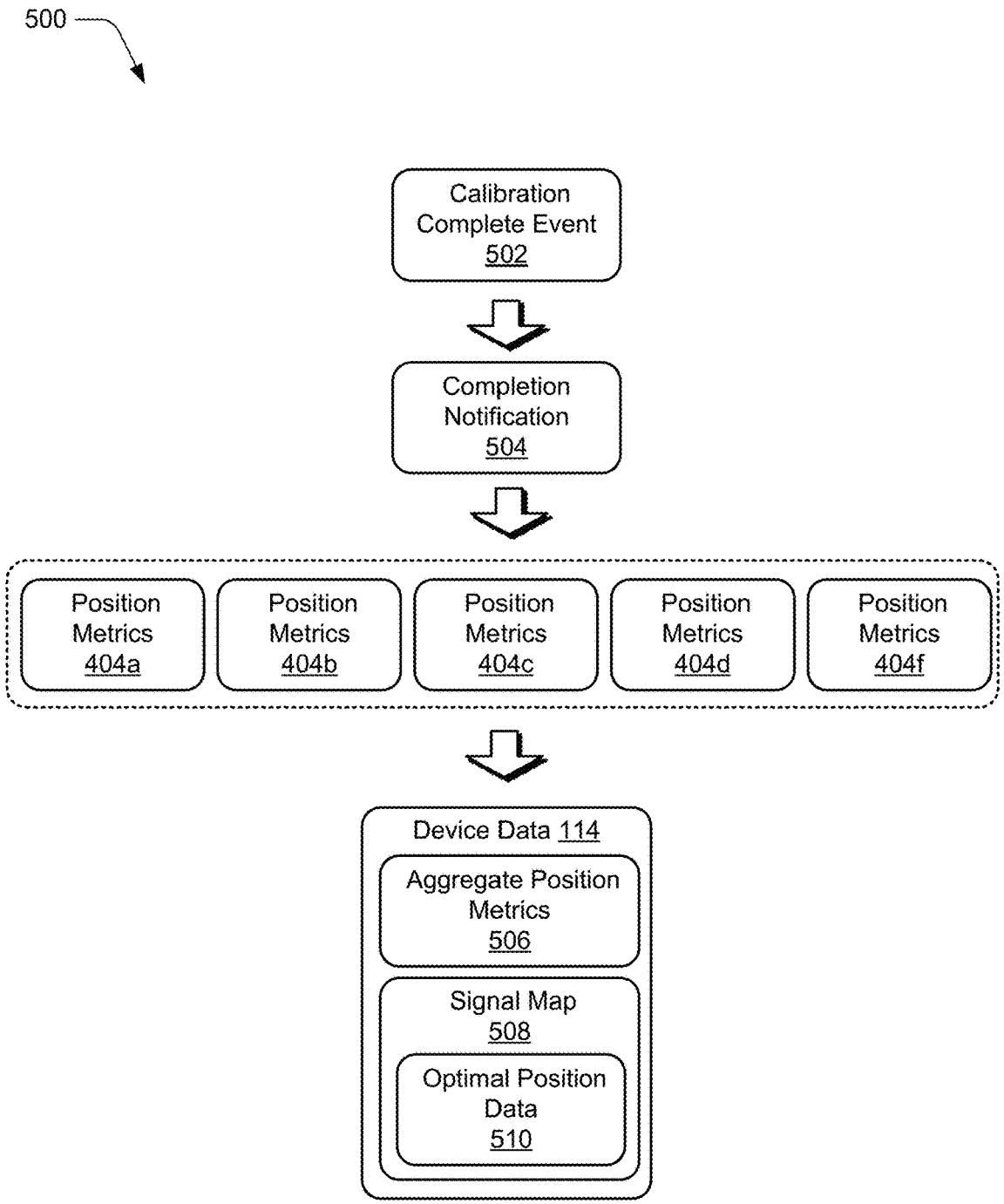
FIG. 5 depicts a scenario for identifying an optimal device position for wireless connectivity in accordance with one or more implementations described herein.

FIG. 5 depicts a scenario 500 for identifying an optimal device position for wireless connectivity. The scenario 500, for instance, represents a continuation and/or extension of the scenarios 200-400, above. In the scenario 500, a calibration complete event 502 occurs indicating that the connectivity module 108 has gathered sufficient data to identify an optimal position for the mobile device 102 to communicate wirelessly with the network connectivity device 118. The calibration complete event 502 may occur in response to different criteria, such as the connectivity interaction 208 and/or movement of the mobile device 102 occurring for a threshold period of time, the mobile device 102 being moved to a threshold number of different positions (e.g., the positions 402a-402f), detected signal quality exceeding a signal quality/signal strength threshold at one of the positions 402a-402f, and so forth. Based on the calibration complete event 502, the connectivity module 108 generates and outputs a completion notification 504, and further generates aggregate position metrics 506 based on the position metrics 404a-404f. Generally, the completion notification 504 represents a user notification that the connectivity check is complete, one example of which is depicted below with reference to FIG. 6.

The aggregate position metrics 506 are generated by aggregating and processing the position metrics 404a-404f. The aggregate position metrics 506, for example, identify different positions of the mobile device 102 (e.g., device location and physical 3D orientation at the location), and characterize attributes of wireless signal detected at different positions, such as the positions 402a-402f. The aggregate position metrics 506 are utilized to generate a signal map 508 that includes optimal position data 510. The signal map 508, for instance, includes identifiers for different physical locations, device orientations at the different locations, and wireless signal attributes detected at each location/orientation. The optimal position data 510 identifies positions of the mobile device 102 where optimum wireless signal attributes are detected, such as locations and orientations with the highest strength and/or highest quality wireless signal. For instance, the optimal position data 510 identifies which of the positions 402a-402f exhibited optimum wireless signal, and which of the antenna modules 112a-112c received the highest quality wireless signal at each position. Consider, for instance, that the connectivity module 108 detected that at the position 402a, the mobile device 102 experienced the highest signal quality as compared with all of the positions 402, and that the antenna module 112a experienced the highest signal quality at the position 402a of all of the antenna modules 112. Accordingly, the optimal position data 510 reflects this observation of the connectivity module 108, e.g., that the position 402a is an optimal position for wireless connectivity for the mobile device 102.

Figure 6:
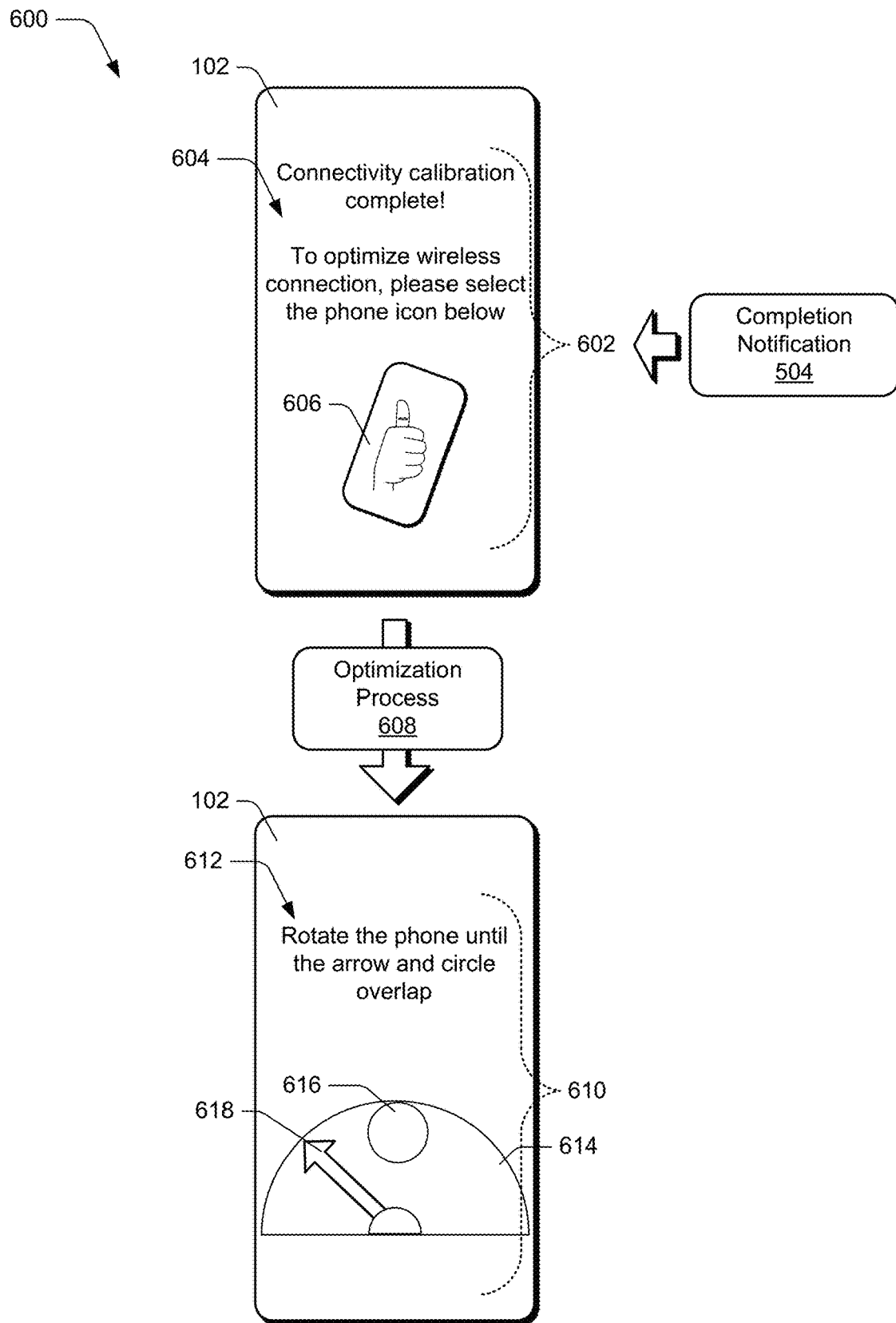
FIG. 6 depicts a scenario for outputting various information based on completion of a calibration process in accordance with one or more implementations described herein.

FIG. 6 depicts a scenario 600 for outputting various information based on completion of a calibration process. The scenario 600, for instance, represents a continuation of the scenarios 200-500, above. In the scenario 600, the connectivity module 108 outputs the completion notification 504 on the mobile device 102. In this example, the completion notification 504 includes a graphical notification 602 that includes a text notification 604 that the calibration process 204 is complete. The graphical notification 602 also includes an optimization prompt 606 that is selectable to enable a user to position the mobile device 102 at a position for optimum wireless communication. For instance, in response to user selection of the optimization prompt 606, an optimization process 608 is initiated for guiding the user 106 to position the mobile device 102 at a position for optimal wireless communication.

As part of the optimization process 608, the connectivity module 108 outputs an optimization notification 610 that provides instructions for placing the mobile device 102 in a position for optimal wireless communication. The optimization notification 610 includes text instructions 612 for positioning the mobile device 102 in an optimal wireless position, and a position prompt 614 that represents a visual form of interactive feedback for guiding a user to position the mobile device 102 for optimal wireless communication. The position prompt 614, for instance, includes a position target 616 and a position indicator 618. In operation, when the mobile device 102 is moved to different positions, the position indicator 618 rotates to indicate a position of the mobile device 102 relative to an optimal wireless position of the mobile device 102. Accordingly, to place the mobile device 102 in the optimal position 510, the user is to manipulate the mobile device 102 to a position where the position indicator 618 overlaps with the position target 616. In at least some implementations, this includes manipulating the mobile device 102 to a particular 3D orientation specified by the optimal position 510.

Figure 7:
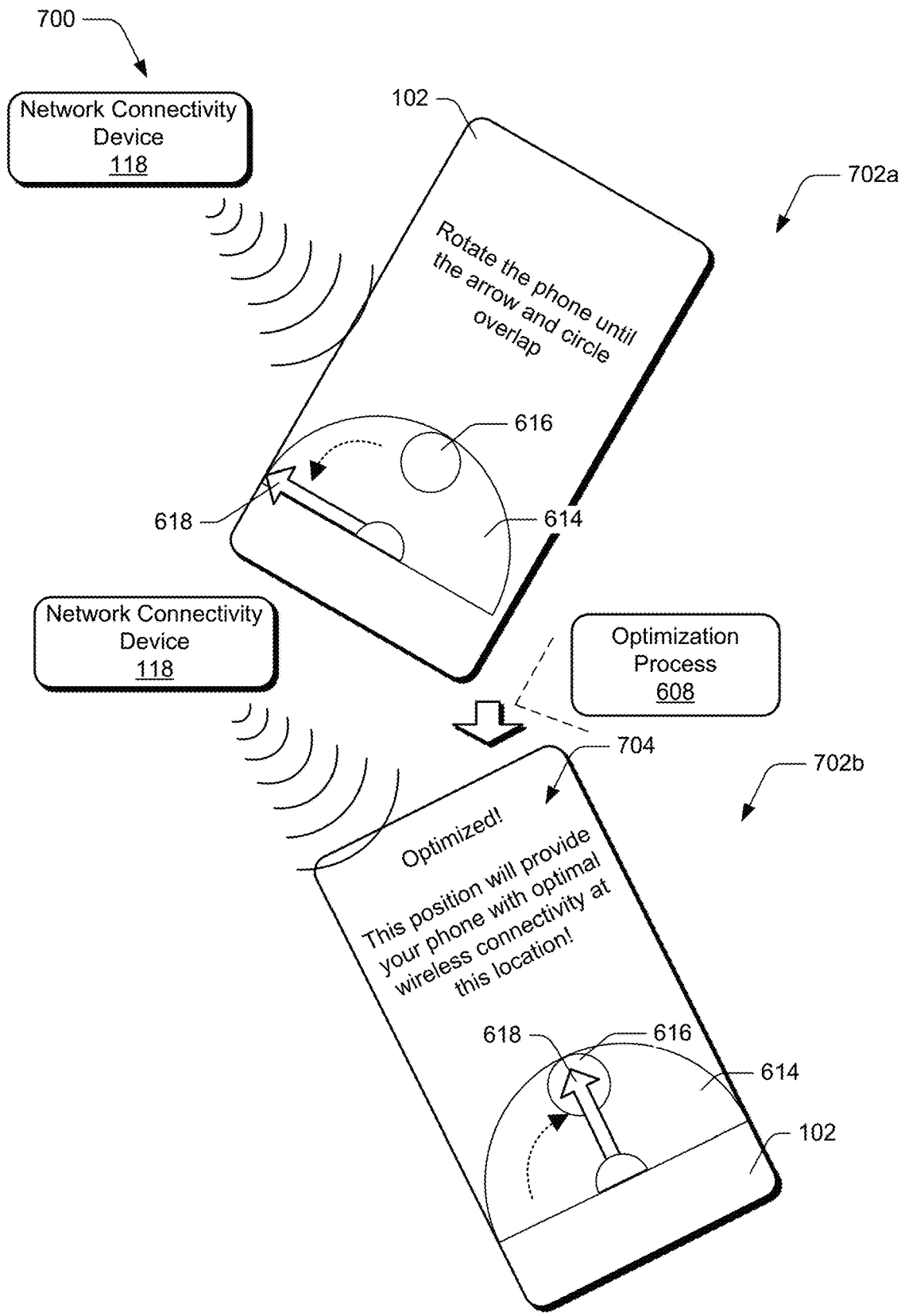
FIG. 7 depicts a scenario for enabling a mobile device to be positioned for optimal wireless performance in accordance with one or more implementations described herein.

FIG. 7 depicts a scenario 700 for enabling a mobile device to be positioned for optimal wireless performance. The scenario 700, for instance, represents a continuation of the scenarios 200-600, above. In the scenario 700, a user manipulates the mobile device 102 to a position 702a while the optimization process 608 is active. Accordingly, the connectivity module 108 adjusts the position prompt 614 to reflect the change in position. The position indicator 618, for instance, rotates within the position prompt 614 to provide a visual indication of the change in position. In this particular example, the position indicator 618 rotates away from the position target 616, indicating that the movement of the mobile device 102 to the position 702a represents movement away from an optimal wireless position. The user then manipulates the mobile device 102 to a position 702b, and the connectivity module 108 rotates the position indicator 618 to reflect the change in position. In the position 702b, the position indicator 618 rotates toward and overlaps the position target 616, indicating that the position 702b represents a position for optimum wireless performance, e.g., as described by the optimal position 510. The connectivity module 108 outputs an optimized notification 704 that includes information indicating that the current position of the mobile device Q is an optimal position for wireless performance.

Generally, the calibration and optimization processes described in the scenarios above can be performed in response to various events, such as based on detecting that the mobile device 102 connects to a network connectivity device 118 that has not previously been calibrated, detecting that the mobile device 102 moves a threshold distance from a location where a calibration process has been performed, based on detecting a significant change in wireless signal quality (e.g., that wireless signal quality falls below a signal quality threshold), in response to user instructions to initiate a calibration process, and so forth.

Further, while the calibration described above involves express user actions to participate in calibration (e.g., the position the mobile device 102 in different positions), in at least some implementations calibration can occur as a background process that does not invoke express user interaction to assist in calibration. For instance, the calibration process 204 can occur as a background process that executes while the user is involved in other tasks, such as movement between different locations and positions incident to other activities, e.g., work-related activities, recreational activities, domestic activities, and so forth. Thus, the calibration process 204 may be implemented without prompting the user for assistance. In at least one implementation, for example, the mobile device 102 does not present a user notification of the calibration process 204 while the process is active.

Figure 8:
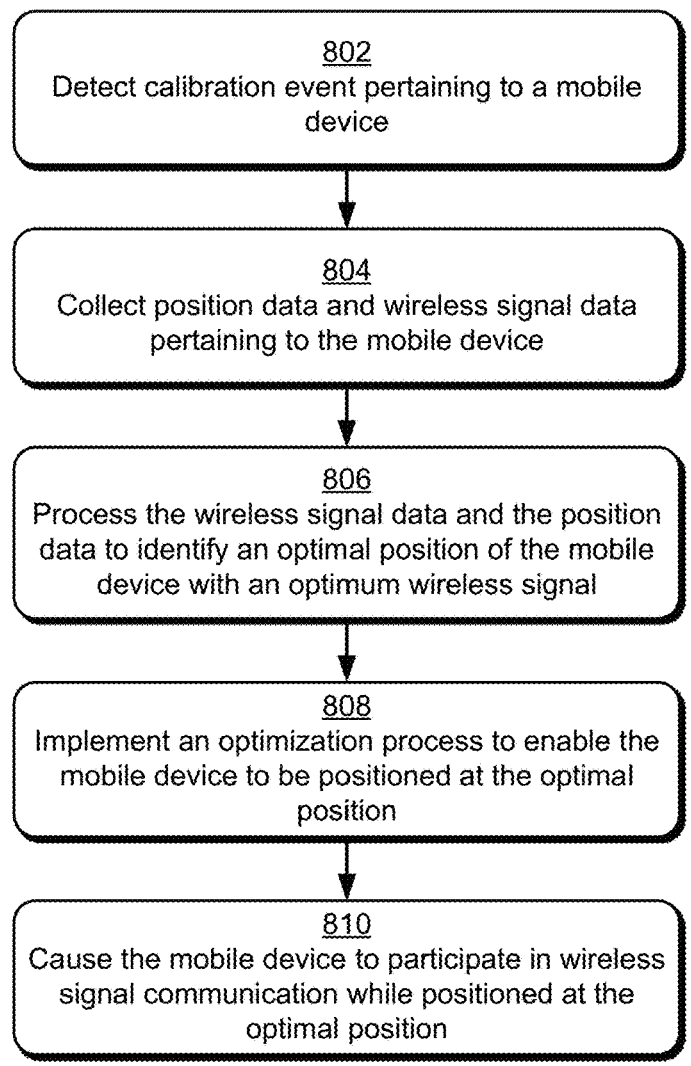
FIG. 8 depicts a method for calibrating wireless performance of a mobile device in accordance with one or more implementations described herein.

FIG. 8 depicts a method 800 for calibrating wireless performance of a mobile device. At 802, a calibration event pertaining to a mobile device is detected. The connectivity module 108, for instance, detects the calibration event 202. Generally, the calibration event 202 is generated in response to a particular state of the mobile device 102 (e.g., change in device state) that indicates that the mobile device 102 is to calibrate its wireless connectivity.

At 804, position data and wireless signal data pertaining to the mobile device are collected. The connectivity module 108, for instance, initiates the calibration process 204, described in detail above. In at least some implementations, the calibration process 204 involves invoking user interaction to assist in calibration, such as via user prompts to position the mobile device 102 in different orientations. Alternatively or in addition, the calibration process 204 can occur as a background process without expressly invoking user participation.

As part of the calibration process 204, the connectivity module 108 detects and collects wireless signal data that describes a wireless signal environment in which the mobile device 102 is positioned. The connectivity module 108, for instance, leverages the antenna modules 112 to receive and/or transmit data wirelessly, and generates the device data 114 based on different attributes of detected wireless signal. For example, the device data 114 includes identifiers for network connectivity devices 118 that are in proximity to the mobile device 102. In a 5G wireless implementation, the identifiers can include gNB identifiers (IDs) for gNB devices that can provide 5G network connectivity to the mobile device 102. The device data 114 also includes signal attribute information, such as frequency band and signal strength, and signal quality information. Examples of signal strength and quality information include signal strength in dBm, received signal strength indicators (RSSI), signal/noise ratio, signal error information (e.g., information about data errors in received signal), and so forth. The connectivity module 108 can also distinguish and characterize wireless signal data for individual antenna modules 112, such as to determine signal attributes at each individual antenna module 112 and for each device position.

The connectivity module 108 also receives position information as part of the calibration process 204, such as via sensor data 122 received from the sensor system 110. Generally, the position information can indicate position of the mobile device 102 in terms of location (e.g., geographical location) and device orientation, such as orientation relative to a 3D space, as well as motion information indicating relative amounts and direction of movement of the mobile device 102. Based on the wireless signal data and the position information, the connectivity module 108 generates a data array for each position that includes the following fields:

location|position|sig_str[antenna]|sig_qual[antenna]
|best_antenna|best_signal

In this array, location specifies a geographical location of the mobile device, such as described using GPS coordinates and/or other location description technique. The position field specifies an orientation of the mobile device 102 at location, such as a 3D orientation. The sig_str[antenna] field specifies wireless signal strength observed at position for each antenna module 112. The sig_qual[antenna] field describes a signal quality observed at position for each antenna module 112. The best_antenna field identifies which antenna module 112 exhibited optimum wireless signal at position, e.g., the highest combination of signal strength and signal quality. The best_signal field identifies the optimum wireless signal, e.g., the signal strength and signal quality observed at best_antenna.

In at least some implementations, the various actions and processes related to device calibration (e.g., the calibration process 204) are performed dynamically and in real time as part of end user (e.g., consumer) interactions with the mobile device 102. The calibration processes, for instance, do not represent set-up actions performed pursuant to device manufacture. Alternatively or in addition, one or more aspects of the described processes may be implemented prior to an end user obtaining the mobile device 102.

At 806, the wireless signal data and the position data are processed to identify an optimal position of the mobile device with an optimum wireless signal. As described above, for instance, the connectivity module 108 correlates wireless strength and quality information with different device orientations to determine an orientation at which the mobile device 102 experiences optimal wireless performance. Further, the connectivity module 108 can specify wireless quality information for individual antenna modules 112 at each device position.

In at least one implementation, the wireless signal data is utilized to generate a signal score that quantifies a relative wireless signal strength and signal quality at different device orientations. The signal score, for instance, can be based on a combination of factors, such as signal strength (e.g., in terms of the power ratio in decibels of the measured power referenced to one milliwatt, or dBm), signal quality (e.g., a number of errors detected in data transmitted via the wireless signal), and so forth. Thus, the higher the signal score, the more optimal a particular device position. In at least one implementation, a device orientation with a highest signal score is identified as an optimal position for the mobile device 102 for wireless signal quality.

At 808, an optimization process is implemented to enable the mobile device to be positioned at the optimal position. The connectivity module 108, for instance, presents a user prompt to notify a user that an optimal wireless position is available to optimize wireless performance of the mobile device 102. The connectivity module 108 can also present user guidance for positioning the mobile device 102 at the optimal position, such as an interactive user experience that guides a user to positioning the mobile device 102 at the optimal wireless position.

At 810, the mobile device is caused to participate in wireless signal communication while positioned at the optimal position. The connectivity module 108, for instance, enables the mobile device 102 to send and receive wireless signal at the optimal position. In at least one implementation, this involves network connectivity via a network connectivity device 118 to a wireless cellular network (e.g., a 5G network), such as for voice and/or data communication.

Figure 9:
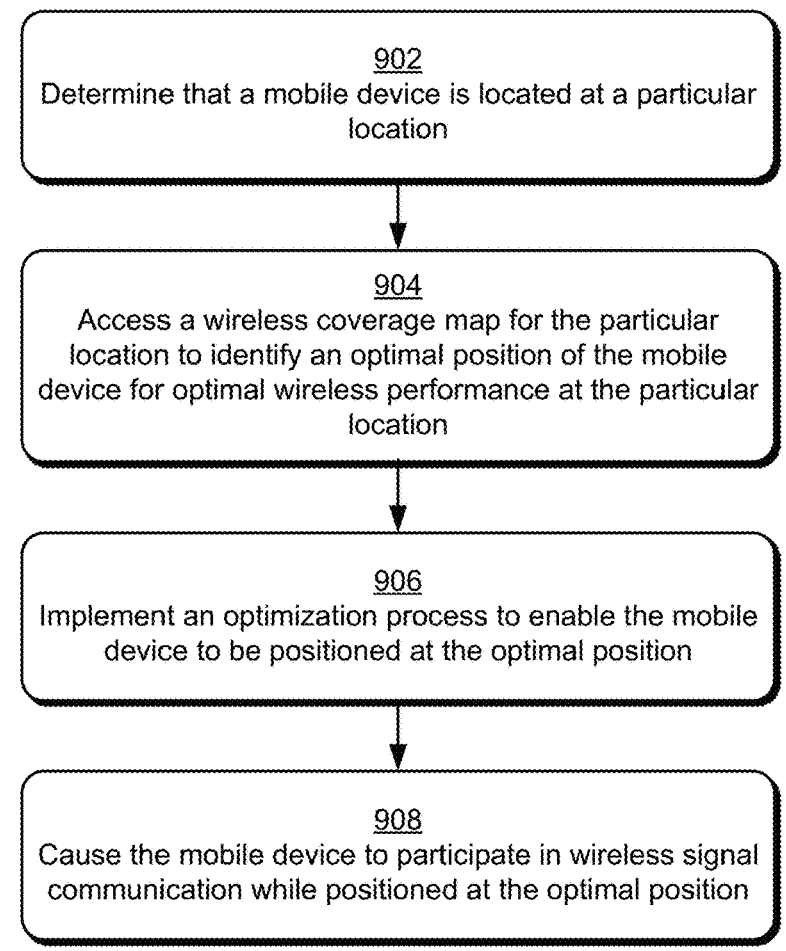
FIG. 9 depicts a method for optimizing wireless performance of a mobile device in accordance with one or more implementations described herein.

FIG. 9 depicts a method 900 for optimizing wireless performance of a mobile device. The method 900, for instance, represents an extension and/or variation of the method 800. At 902, a determination is made that a mobile device is located at a particular location. The connectivity module 108, for instance, receives a notification that the mobile device 102 is located at a particular geographic location. For example, the sensor system 110 detects that the mobile device 102 is located at a particular location for a threshold period of time, such as n seconds/minutes. The sensor system 110 then notifies the connectivity module 108 that the mobile device 102 is located at the location. In at least one implementation, the sensor system 110 can include an identifier for the location, such as an identifier that is usable by the connectivity module 108 to distinguish the location from other known locations.

In an alternative or additional implementation, the connectivity module 108 connects to a network connectivity device 118 that is positioned at a particular location, such as for wireless cellular network connectivity. Accordingly, the connectivity module 108 determines that the mobile device 102 is located at a known location where the network connectivity device 118 is positioned.

At 904, a wireless coverage map for the particular location is accessed to identify an optimal position of the mobile device for optimal wireless performance at the particular location. The connectivity module 108, for instance, performs a lookup in the signal map 508 to identify the optimal position 510 at a location. For example, the signal map 508 correlates particular locations (e.g., geographic locations) and/or network connectivity devices 118 to optimal positions for wireless communication for the mobile device 102.

At 906, an optimization process is implemented to enable the mobile device to be positioned at the optimal position. As explained above, for example, the connectivity module 108 outputs positioning guidance that provides an interactive experience for enabling a user to manipulate the mobile device 102 to an optimal position for wireless communication.

At 908, the mobile device is caused to participate in wireless signal communication while positioned at the optimal position. For instance, the connectivity module 108 causes the mobile device 102 to transmit and/or receive wireless signal while positioned at the optimal position, such as for voice and/or data communication.

Figure 10:
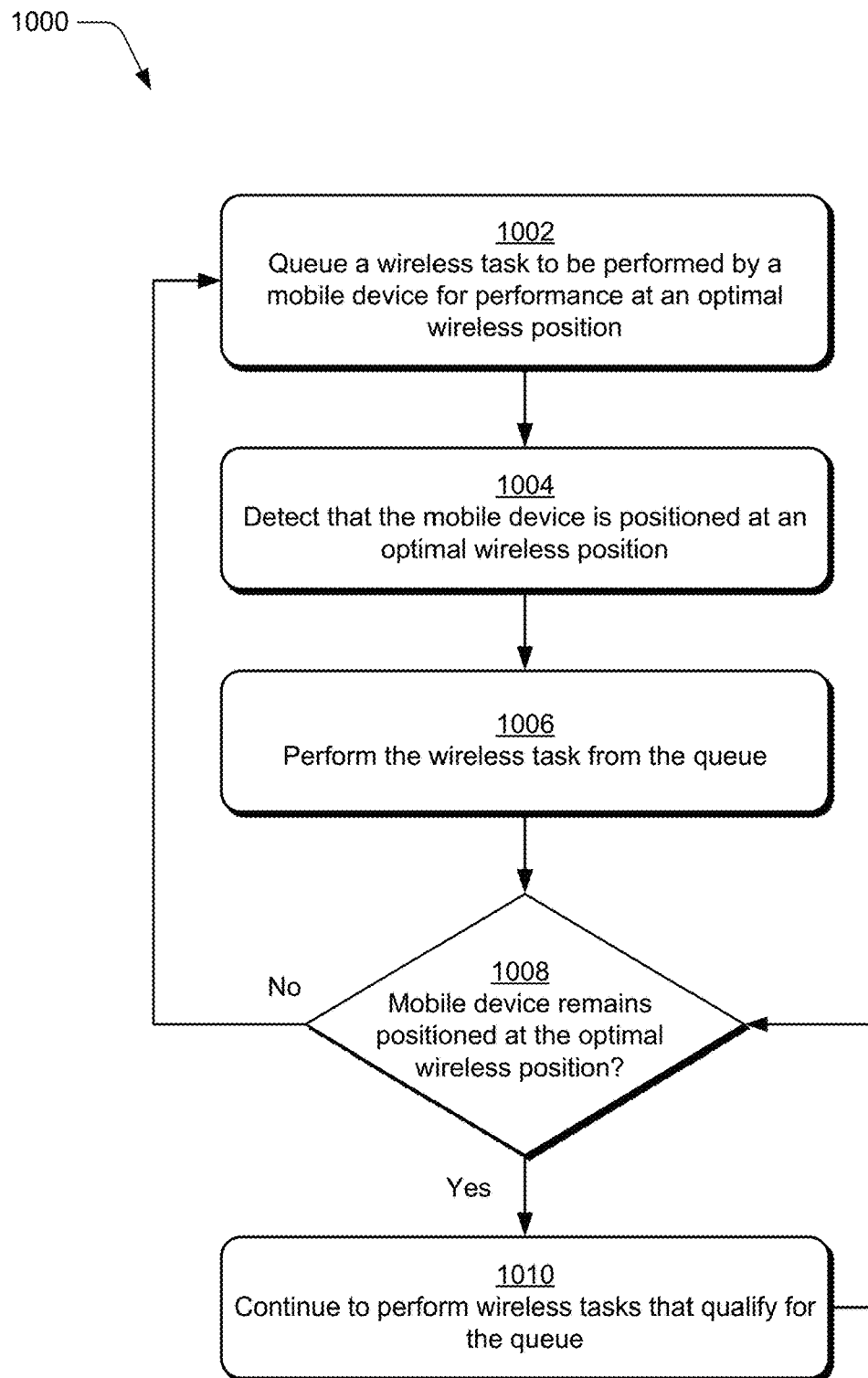
FIG. 10 depicts a method for performing tasks while positioned at an optimal position for wireless communication in accordance with one or more implementations described herein.

FIG. 10 depicts a method 1000 for performing tasks while positioned at an optimal position for wireless communication. The method 1000, for instance, can be performed in conjunction with the methods 800, 900. At 1002, a wireless task to be performed by a mobile device is queued for performance at an optimal wireless position. An operating system of the mobile device 102, for instance, places different wireless-related tasks in the task queue 126 to be performed when the mobile device 102 is located at an optimal wireless position. In at least one implementation, tasks are placed in the task queue 126 when the mobile device is positioned away from an optimal wireless position, e.g., in a position different than an optimal wireless position. Examples of different wireless tasks that can be queued include wireless downloads, wireless uploads, and/or other tasks that involve wireless communication.

At 1004, it is detected that the mobile device is positioned at an optimal wireless position. The connectivity module 108, for instance, detects that the mobile device 102 is positioned at an optimal wireless position, such as based on position data received from the sensor system 110. For example, the connectivity module 108 compares position information received from the sensor system 110 to the signal map 508 to determine that the mobile device 102 is positioned at an optimal wireless position.

At 1006, the wireless task from the queue is performed. For instance, based on detecting that the mobile device 102 is located at an optimal wireless position, the connectivity module 108 causes the wireless task to be performed. In at least one implementation, this include retrieving wireless tasks from a queue maintained by an operating system of the mobile device 102, e.g., the task queue 126. In a scenario where multiple wireless tasks are queued, the order in which the wireless tasks are performed can be based on different criteria. For instance, the queue may be managed on a first in/first out basis such that the first task placed in the queue is performed first, followed by subsequent tasks in order of placement in the queue. Alternatively or in addition, certain high priority wireless tasks can be performed first, e.g., before other lower priority tasks that may have been placed in the queue first. For instance, if a particular wireless task involves a larger data transfer than other lower priority tasks, the particular wireless task can be prioritized and performed before the other tasks. In another example, certain wireless tasks may be marked as high-priority communications, such as time sensitive communications that are marked to be expedited, and thus can be escalated above other tasks in the queue. In yet another example, certain tasks may be indicated as critical to system performance, such as security updates for the mobile device. Accordingly, such system-related tasks may be escalated above other tasks in the queue. Generally, a variety of different criteria may be specified for determining an order in which tasks from the queue are performed.

At 1008, it is determined whether the mobile device remains positioned at the optimal wireless position. The sensor system 110, for instance, monitors a position of the mobile device 102 on a periodic basis. Accordingly, if the position of the mobile device 102 changes, the sensor system 110 can communicate updated position data to the connectivity module 108. The connectivity module 108 can then compare the updated position data to the signal map 508 to determine if the mobile device 102 has moved away from an optimal wireless position.

If the mobile device remains positioned at the optimal wireless position ("Yes"), at 1010 wireless tasks that qualify for the queue continue to be performed. For instance, additional wireless tasks from the task queue 126 can continue to be performed. Additionally or alternatively, additional wireless tasks that qualify to be placed in the queue (e.g., that are marked for placement in the queue) can be performed, such as by either placing them in the queue and then performing the wireless tasks, or by bypassing the queue and performing the wireless tasks without first queuing them.

Accordingly, by queueing certain wireless tasks until the mobile device 102 is detected at an optimal wireless position, performance attributes of the mobile device 102 can be optimized. For instance, utilizing an optimal wireless position with higher quality wireless attributes utilizes less power resources (e.g., battery charge) as compared with other positions with lower quality wireless attributes. Further, device resources (e.g., processor bandwidth, memory, and so forth) utilized to manage a wireless task will be occupied for a shorter period of time at a position with higher quality wireless signal as compared with other positions with lower quality wireless signal. The method may then return to 1008 to monitor for changes in device position.

If the mobile device is no longer positioned at the optimal wireless position ("No"), the method can return to 1002 where certain wireless tasks are queued until the mobile device 102 is again detected at an optimal wireless position where the queued tasks can be performed.

Figure 11:
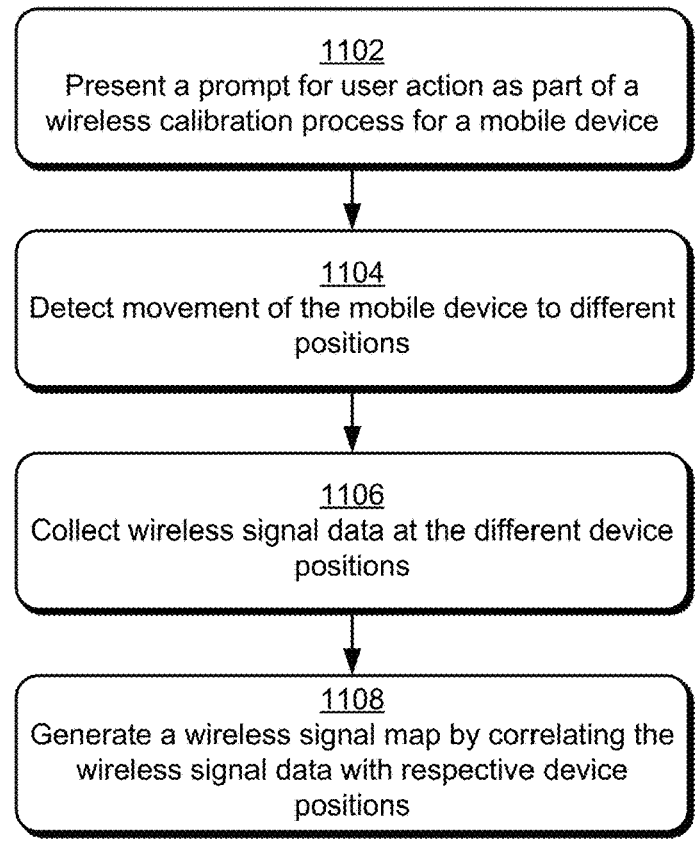
FIG. 11 depicts a method for enabling user interaction as part of a calibration process in accordance with one or more implementations described herein.

FIG. 11 depicts a method 1100 for enabling user interaction as part of a calibration process. The method 1100, for instance, can be performed in conjunction with the methods 800-1000. At 1102, a prompt for user action is presented as part of a wireless calibration process for a mobile device. For instance, based on initiation of the calibration process 204, the connectivity module 108 presents the connectivity prompt 206, attributes of which are detailed above.

At 1104, movement of the mobile device to different positions is detected. The connectivity module 108, for example, receives sensor data 122 from the sensor system 110 identifying different positions (e.g., orientations) of the mobile device 102. At 1106, wireless signal data is collected at the different device positions. For instance, the connectivity module 108 collects various measurements of wireless signal attributes at different positions of the mobile device 102. Various examples of such wireless signal attributes are discussed above, and include signal quality information, IDs for network connectivity devices 118 and/or wireless networks, and so forth.

At 1108, a wireless signal map is generated by correlating the wireless signal data with respective device positions. The signal map 508, for instance, identifies discrete device positions, e.g., geographic location and device orientations at the geographic location. The signal map 508 further identifies signal attributes at each discrete device position, such as wireless signal quality observed at each device position. In at least one implementation, the signal map 508 ranks the device positions based on observed wireless signal quality at each position. Thus, a device position (or multiple device positions) can be designated as optimal positions for wireless communication.

In at least one implementation, the calibration process can be performed at different geographic locations. Thus, the signal map 508 can be indexed by geographical location such that for each geographical location, the signal map 508 identifies multiple device positions, signal attributes at each position, and a set of optimal device positions at the geographical location. Generally, this enables the signal map 508 to be queried to identify an optimal position for wireless communication when the mobile device 102 is detected at a particular geographic location.

Figure 12:
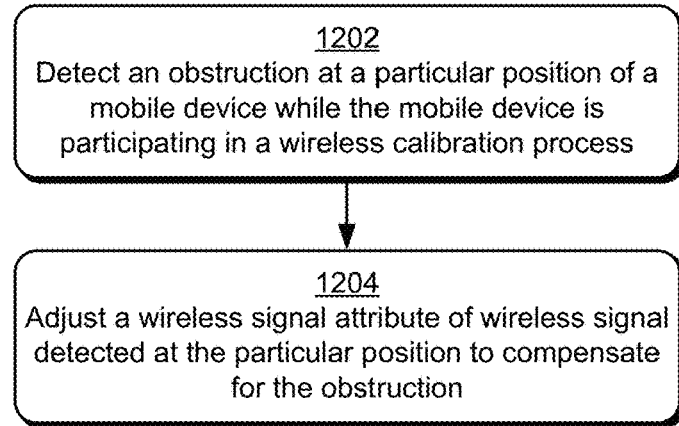
FIG. 12 depicts a method for incorporating a detected obstruction into a calibration process in accordance with one or more implementations described herein.

FIG. 12 depicts a method 1200 for incorporating a detected obstruction into a calibration process. The method 1200, for instance, can be performed in conjunction with the methods 800-1100. At 1202, an obstruction is detected at a particular position of a mobile device while the mobile device is participating in a wireless calibration process. For instance, while the connectivity module 108 is implementing the calibration process 204, the connectivity module 108 detects that a physical obstruction is present that may affect wireless communication of the mobile device 102. As discussed above, the sensor system 110 may detect the obstruction using various types of sensor techniques. Accordingly, the sensor system 110 can notify the connectivity module 108 of the presence of the obstruction.

At 1204, a wireless signal attribute of wireless signal detected at the particular position is adjusted to compensate for the obstruction. For instance, consider that the connectivity module 108 generates confidence scores 412 for multiple device positions during the calibration process. Accordingly, a confidence score 412 for the particular position can be adjusted (e.g., decreased) to indicate that the obstruction may have affected wireless signal attributes detected at the particular position. In at least one implementation, an obstruction factor 410 can be predefined (e.g., prior to the calibration process) and applied to the confidence score based on the obstruction.

Figure 13:
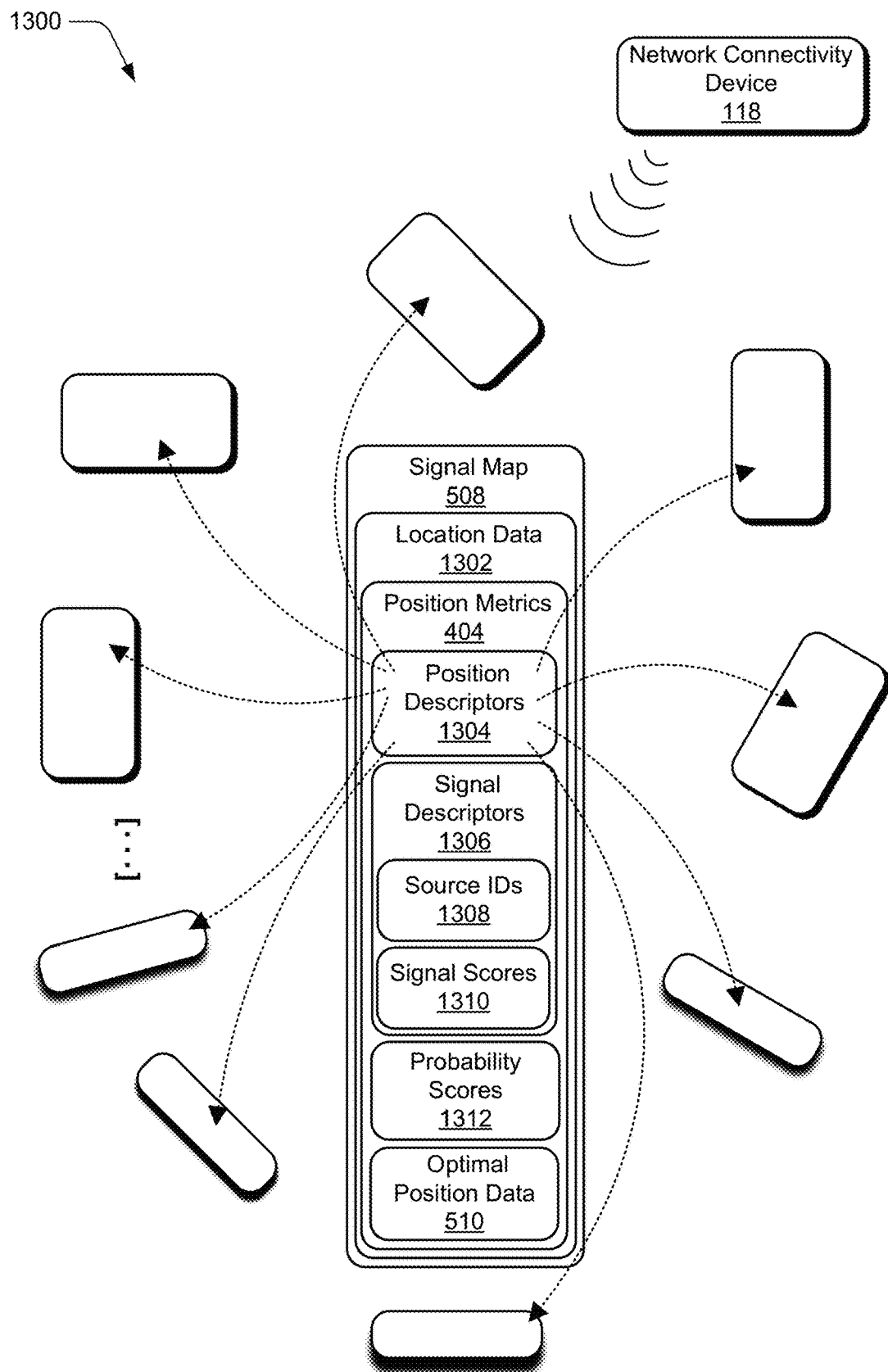
FIG. 13 depicts a scenario which presents a detailed implementation of a signal map in accordance with one or more implementations described herein.

FIG. 13 depicts a scenario 1300 which presents a more detailed discussion of the signal map 508, generated at described above. The signal map 508 includes location data 1302, which in turn includes the position metrics 404, examples of which are described above. The location data 1302 describes different physical locations of the mobile device 102, such as geographic locations where the mobile device 102 is/has been present. The location data 1302 may be implemented in various ways, such as via geographical coordinates (e.g., GPS coordinates), location place names, street addresses, and so forth. As mentioned above, the position metrics 404 describe different orientations (e.g., 3D orientations) of the mobile device 102, and wireless signal attributes detected at the different orientations. For instance, the position metrics 404 include position descriptors 1304 and signal descriptors 1306.

The position descriptors 1304 represent data that describes different orientations of the mobile device 102, such as 3D orientations of the mobile device 102 at different locations. The position descriptors 1304, for example, describe different orientations of the mobile device 102 in a 3D space, such as relative to a gravity vector. Further, the different orientations can be specific to locations defined by the location data 1302. The signal descriptors 1306 represent data that describes attributes of wireless signal detected at locations defined by the location data 1302, and device positions described by the position descriptors 1304. Different attributes of wireless signal are described above, and include identifiers for wireless networks and/or network connectivity devices 118, signal strength, signal quality, and so forth. The signal descriptors 1306, for instance, include source IDs 1308 and signal scores 1310. The source IDs 1308 represent identifiers for different wireless signal sources, such as different instances of the network connectivity devices 118. In a 5G scenario, for instance, the source IDs 1308 include gNB IDs for gNB devices that can provide 5G network connectivity to the mobile device 102. In at least one implementation, the source IDs 1308 are specific to wireless signal sources identified at specific locations identified by the location data 1302, and positions identified by the position descriptors 1304. Further, the signal descriptors 1306 specify wireless signal attributes for instances of wireless signal sources identified by the source IDs 1308.

The signal scores 1310 represent characterizations of wireless signal detected at locations identified by the location data 1302 and positions identified by the position descriptors 1304. Generally, the signal scores 1310 can be generated based on signal strength and/or signal quality from different signal sources identified by the source IDs 1308. For instance, an individual signal score 1310 can represent a combination (e.g., summation) of signal strength values and signal quality values for a particular signal source. Each source ID 1308, for example, includes a corresponding signal score 1310. In at least one implementation, the signal scores 1310 represent implementations and/or variations of the signal scores 406, described above.

The position metrics 404 also include probability scores 1312 that represent a probability that a successful connectivity to a wireless signal source can be obtained at locations identified by the location data 1302 and/or positions identified by the position descriptors 1304. In at least one implementation, a high probability score 1312 indicates a high likelihood of obtaining wireless connectivity, and a low probability score 1312 indicates a low probability of obtaining wireless connectivity. Generally, the probability scores 1312 can be based on historical wireless signal attributes detected at different locations/orientations of the mobile device 102. Further, and as described below, the probability scores 1312 can be updated based on events pertaining to attempts to obtain wireless connectivity at different locations/orientations. For instance, a probability score 1312 for a particular location can be increased based on a successful connection to a wireless signal source at the location, and can be decreased based on an unsuccessful connection attempt at the location. The position metrics 404 also include the optimal position data 510, which describes an optimal orientation of the mobile device 102 at different locations defined by the location data 1302.

Accordingly, each location defined by the location data 1302 includes a different set of position metrics 404. As further described below, the connectivity module 108 can utilize the signal map 508 to make various decisions regarding wireless connectivity at different locations and orientations defined by the location data 1302.

Figure 14:
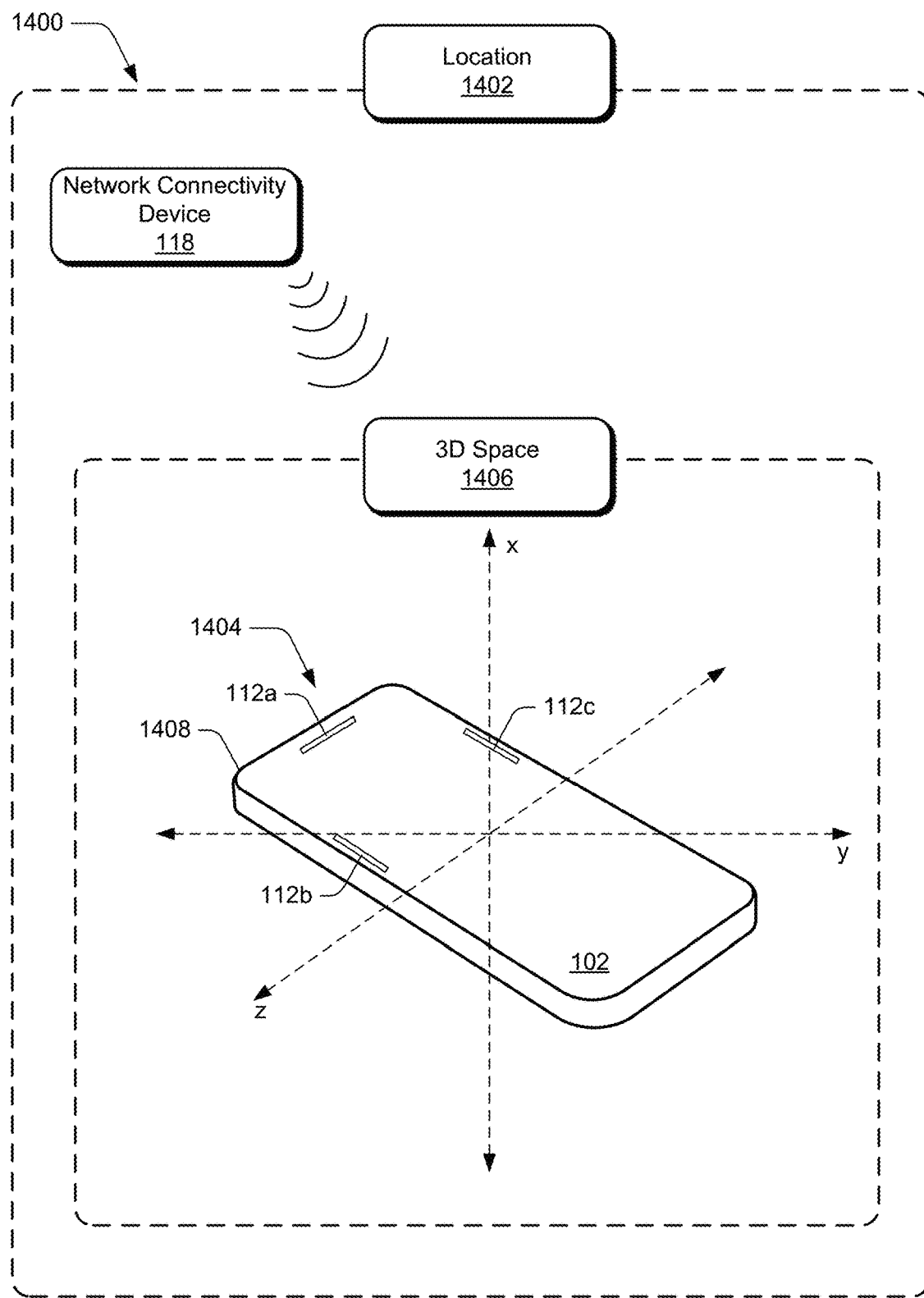
FIG. 14 depicts an example scenario for determining an orientation of a device in accordance with one or more implementations described herein.

FIG. 14 depicts an example scenario 1400 for determining an orientation of a device. In the scenario 1400, the mobile device 102 is located at a particular location 1402, such as a geographic location defined by the location data 1302. Further, the mobile device 102 is positioned at an orientation 1404 relative to a 3D space 1406 at the location 1402. In this particular example, the 3D space 1406 represents an xyz coordinate space, with the x axis representing a gravity vector. Accordingly, the orientation 1404 of the mobile device 102 can be described relative to the 3D space 1406. For instance, consider that a chassis 1408 of the mobile device 102 is characterized as a plane that is positioned within the 3D space 1406. Accordingly, the orientation 1404 can be described as a set of xyz coordinates that describe a position and/or angle of the chassis 1408 in the 3D space 1406.

In at least one implementation, the orientation 1404 may also describe the position the mobile device 102 with reference to the antenna modules 112a-112c. For instance, the orientation 1404 may be directional in nature and may not only describe a position of a chassis 1408 of the mobile device 102 in the 3D space 1406, but may also describe a directional orientation of the mobile device 102 relative to the antenna modules 112a-112c. For instance, consider that the location 1402 includes an instance of a network connectivity device 118. Accordingly, the orientation 1404 may describe an orientation of the mobile device 102 with reference to a directional orientation of the antenna modules 112a-112c relative to the network connectivity device 118, such as whether the antenna modules 112a-112c are pointing toward the network connectivity device 118, are positioned at a particular angle that is acute or obtuse relative to the network connectivity device 118, are pointed away from the network connectivity device 118, and so forth. As described previously, the sensor data 112 from the sensor system 110 may be leveraged to detect and define the orientation 1404, such as relative to the gravity vector x. These example ways for determining an orientation of the mobile device 102 are presented for purposes of example only, and it is to be appreciated that a variety of different ways for determining and describing device orientation may be utilized within the scope of the described implementations.

Figure 15:
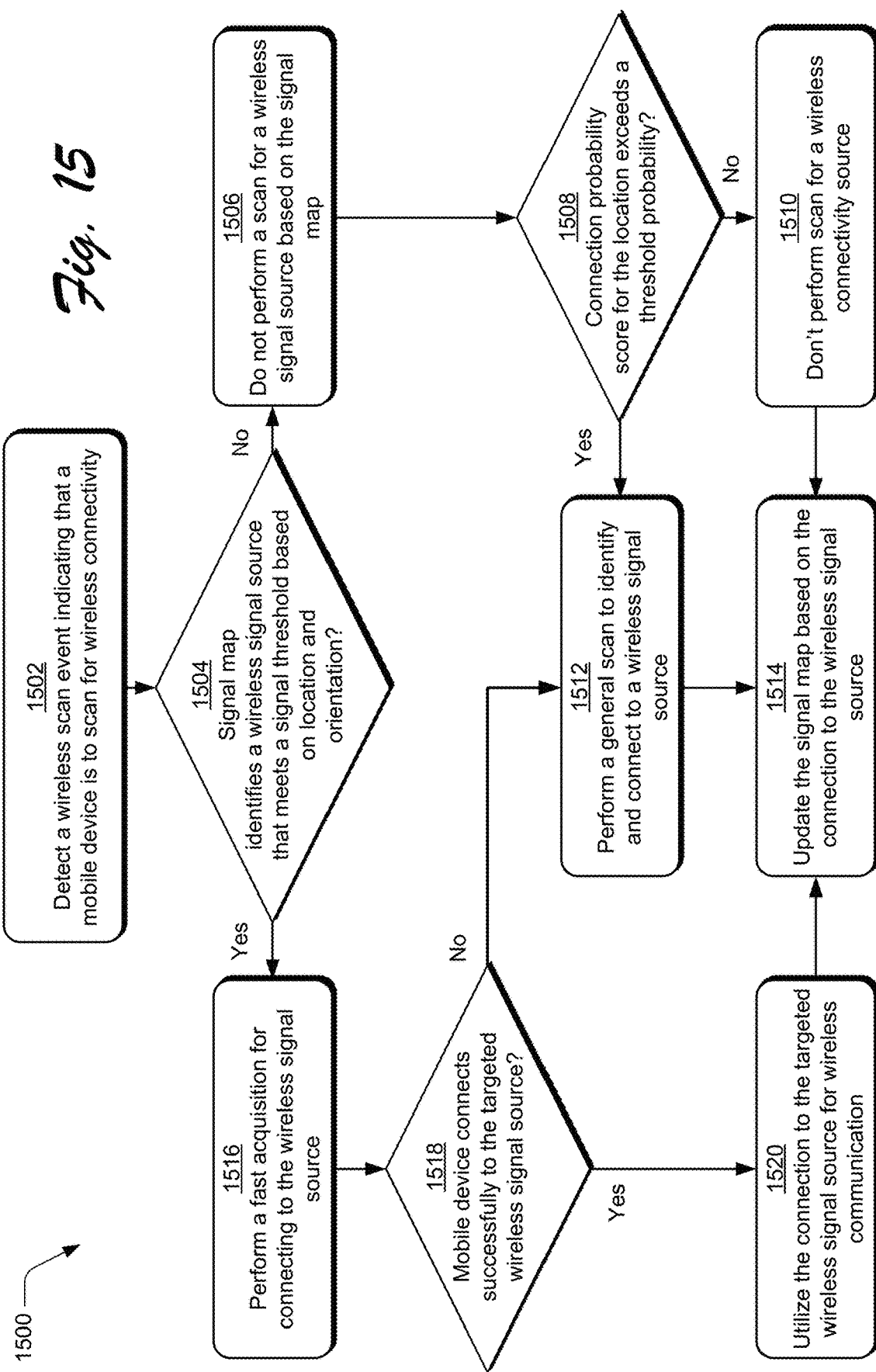
FIG. 15 depicts a method for managing a wireless scan event in accordance with one or more implementations described herein.

FIG. 15 depicts a method 1500 for managing a wireless scan event. The method 1500, for instance, can be performed in conjunction with the scenarios and/or methods described above.

At 1502, a wireless scan event is detected indicating that a mobile device is to scan for wireless connectivity. Generally, various types of events can cause the wireless scan event, such as a power on event for the mobile device 102 causing the connectivity module 108 to search for wireless connectivity, an idle scan event of the mobile device 102, a loss of wireless connectivity of the mobile device 102, and so forth.

At 1504, a signal map is queried with a location and orientation of the mobile device to determine whether the signal map identifies a wireless signal source that meets a signal threshold. The connectivity module 108, for instance, queries the signal map 508 with a location identifier and orientation data describing a location and orientation of the mobile device 102. In at least one implementation, the location identifier and orientation data are received as part of the sensor data 122 from the sensor system 110. For example, the connectivity module 108 determines whether a source of wireless signal (e.g., a network connectivity device 118) that corresponds to the received location and orientation data meets a signal threshold, such as a threshold signal score. As mentioned above, signal scores can be generated for different sources of wireless connectivity, such as based on wireless signal strength and signal quality observed from different wireless connectivity sources and at different locations and orientations of the mobile device 102. Accordingly, the signal threshold can be specified as a threshold signal score.

If the signal map does not identify a wireless signal source that meets the signal threshold ("No"), at 1506 the mobile device does not perform a scan for a wireless signal source based on the signal map. The connectivity module 108, for instance, determines that a wireless signal source that meets the signal threshold is not identified in the signal map 508 based on the location and position data for the mobile device 102. For instance, while a wireless signal source may be available for serving wireless signal based on the location and position data, a wireless signal score for the available source may be identified in the signal map 508 as being below a signal score threshold. In at least one implementation, if a wireless signal source that meets the signal threshold is not identified in the signal map 508 based on a current location/orientation of the mobile device 102, the connectivity module 108 can output a user prompt to move the location/orientation of the mobile device 102 to attempt to obtain optimal wireless connectivity At 1508, it is determined whether a connection probability score for the location exceeds a threshold probability. For instance, based on previous connection attempts at the location, the signal map 508 can track a probability that a successful connection to a wireless network will occur at the location and generate a probability score 1312 based on the probability. Generally, the probability can be based on whether previous connection attempts were successful or not at the location. The probability score 1312 can be based on wireless sources identified in the signal map 508, or other wireless sources not identified in the signal map 508. For instance, the probability score 1312 can be based on probability of successfully obtaining wireless connectivity and independent of an identity of a wireless signal source used to obtain the connectivity. Alternatively or in addition, the probability score 1312 can be specified to wireless signal sources identified in the signal map 508.

If a connection probability score for the location does not exceed a threshold probability ("No"), at 1510 a scan for a wireless connectivity source is not performed. The method may then return to 1504, e.g., the signal map 508 may again be queried with updated location and/or orientation data to determine whether the signal map 508 identifies a wireless signal source that meets the signal threshold.

In at least one implementation, if a connection probability score for the location does not exceed a threshold probability based on a current location/orientation of the mobile device 102, the connectivity module 108 can output a user prompt to move the location/orientation of the mobile device 102 to attempt to obtain optimal wireless connectivity.

If a connection probability score for the location exceeds a threshold probability ("Yes"), at 1512 a general scan is performed to identify and connect to a wireless signal source. The connectivity module 108, for instance, performs a broad spectrum scan to determine if a wireless signal source is available for wireless connectivity. The general scan, for instance, is not targeted to a specific wireless signal source, but scans across multiple wireless frequencies for an available source. Accordingly, an available wireless signal source is identified, and the mobile device 102 connects to the available wireless signal source.

At 1514, the signal map is updated based on the connection to the wireless signal source. The signal map 508, for instance, is updated to include attributes of the wireless signal source, such as an identifier for the wireless signal source, wireless signal strength, wireless signal quality, wireless frequency utilized, and so forth. For example, a new entry is created in the signal map 508 for the wireless signal source, or an existing entry for the wireless signal source is updated. Accordingly, the new/updated entry may be located in the signal map 508 when a mobile device subsequently searches for a wireless signal source at the location.

In at least one implementation, a probability score 1312 for the location is updated based on the result of the general scan. For instance, if the general scan is successful in obtaining wireless connectivity, a probability score 1312 for the location is either left unchanged (e.g., if the probability score 1312 is already at a maximum) or is increased to reflect the successful wireless connectivity at the location. Further, if the general scan is unsuccessful, the probability score can be decreased.

Returning to 1504, if the signal map identifies a wireless signal source that meets the signal threshold ("Yes"), at 1516 the mobile device performs a fast acquisition process for connecting to the wireless signal source. For instance, the connectivity module 108 determines that based on the location and orientation of the mobile device 102, a wireless signal source is identified in the signal map 508 that includes a signal score 1310 that meets the signal threshold. Accordingly, as part of the fast acquisition process, the connectivity module 108 can utilize source acquisition parameters from the signal map 508 to connect to the identified wireless signal source.

For example, the signal descriptors 1306 include a source ID 1308 and connectivity information for connecting to a wireless connectivity device 118 that meets the signal threshold. The connectivity information, for instance, includes a frequency band utilized by a particular wireless connectivity device 118. Further, the connectivity information includes other information specific to the wireless connectivity device 118, such as connection parameters previously learned from a System Information Block Type 1 (SIB1) which carries cell access related information and supplies the mobile device 102 with the scheduling of other system information blocks. Further, the connection parameters can be previously learned from other information elements, such as a Master Information Block (MIB) that includes system information transmitted by the wireless connectivity device 118. Thus, the signal descriptors 1306 can include connectivity information that can be used for a fast acquisition connection to a particular instance of wireless connectivity device 118 and/or wireless network, in contrast with a general scan for any available wireless signal source.

At 1518, a determination is made whether a connection of the mobile device to the targeted wireless signal source is successfully made. The connectivity module 108, for instance, determines whether the identified wireless signal source is detected as part of the fast acquisition process and if so, attempts to negotiate a wireless connection to the wireless signal source. If the connection of the mobile device to the targeted wireless signal source is successfully made ("Yes"), at 1520 the mobile device utilizes the connection to the targeted wireless signal source for wireless communication. For instance, as part of the fast acquisition process, the mobile device 102 successfully detects and negotiates a wireless connection to a network connectivity device 118, and utilizes the wireless connection to send an receive wireless signal, such as for voice and/or data communication via a wireless network 104. In at least one implementation, a probability score 1312 for the location can be updated (e.g., increased) to reflect the successful connection.

If the connection of the mobile device to the targeted wireless signal source is not successfully made ("No"), the method proceeds to 1512 where a general scan is performed to identify and connect to a wireless signal source, such as described above.

Generally, the signal map 508 can be updated at 1514 based on different connectivity-related events, such as a successful or unsuccessful connection to a targeted wireless signal source, a successful or unsuccessful connection to a wireless signal source as part of a general scan, and so forth.

Accordingly, techniques described herein provide flexible ways for obtaining wireless connectivity at different locations and orientations of a mobile device.

Figure 16:
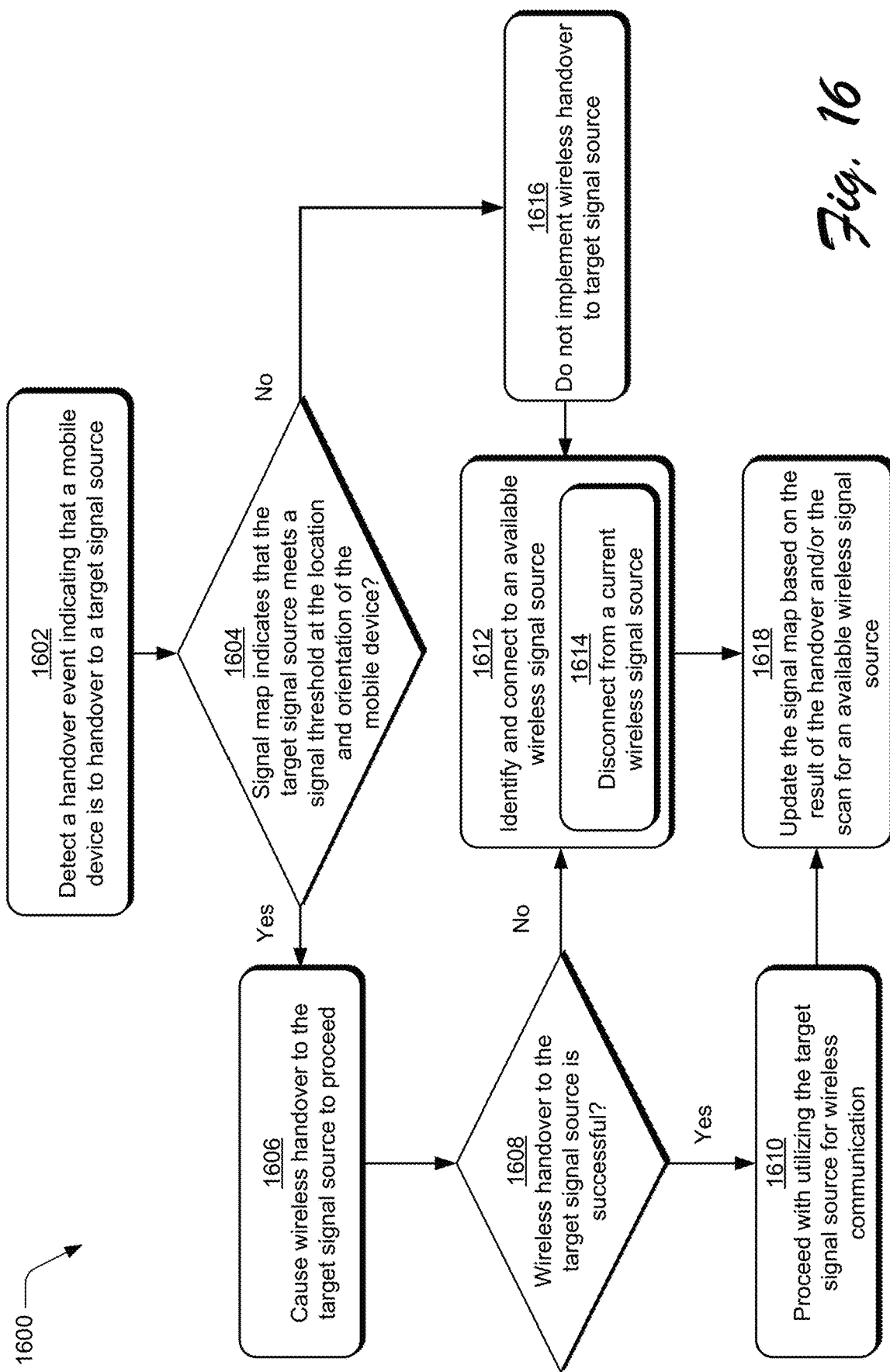
FIG. 16 depicts a method for managing a wireless handover event in accordance with one or more implementations described herein.

FIG. 16 depicts a method 1600 for managing a wireless handover event. The method 1600, for instance, can be performed in conjunction with the scenarios and/or methods described above.

At 1602, a handover event is detected indicating that a mobile device is to perform a wireless handover to a target signal source. The handover event, for instance, can be generated by the mobile device 102 (e.g., by the connectivity module 108), and/or can be received from a remote source, such as the connectivity service 128 and/or a network connectivity device 118. In at least one implementation, the handover event can indicate that the mobile device 102 is to perform a wireless handover from a currently connected network connectivity device 118 to a different instance of a network connectivity device 118. Generally, a handover event can be triggered in response to different occurrences, such as movement of the mobile device 102 between different locations, deterioration of signal strength and/or signal quality for a current wireless connection of the mobile device 102, and so forth.

At 1604, a signal map is queried with a location and orientation of the mobile device to determine whether the signal map indicates that the target signal source meets a signal threshold at the location and orientation of the mobile device. The connectivity module 108, for instance, queries the signal map 508 with a source ID 1308 for the target signal source, a location of the mobile device 102, and an orientation (e.g., 3D orientation) of the mobile device 102. As mentioned above, the signal map 508 correlates different device locations and device positions (e.g., as identified in the position descriptors 1304) with wireless signal attributes at the locations/positions, such as wireless signal strength and/or quality for different wireless signal sources (e.g., as identified by the source IDs 1308) at the locations/positions. In at least some implementations, different locations/orientations identified in the signal map 508 are each associated with a source ID 1308 that identifies an optimal signal source at each location/orientation, such by correlating signal scores 1310 with signal sources at each location/orientation. Thus, an optimal signal source at a particular location/orientation may represent a wireless signal source with a highest signal score 1310.

If the target signal source meets the signal threshold ("Yes"), at 1606 a wireless handover to the target signal source is caused to proceed. The connectivity module 108, for instance, proceeds to negotiate a handover from a current network connectivity device 118 to a different network connectivity device 118 that represents the target wireless signal source.

At 1608, it is determined if the wireless handover to the target signal source is successful. If the handover to the target signal source is successful ("Yes"), at 1610 the mobile device proceeds with utilizing the target signal source for wireless communication. Further, the connectivity module 108 may update the signal map 508 to reflect the successful handover. For instance, a probability score 1312 for the location of the mobile device and/or the target signal source may be increased to reflect the successful handover.

If the handover to the target signal source is not successful ("No"), at 1612 the mobile device identifies and connects to an available wireless signal source. The connectivity module 108, for instance, performs a fast acquisition process (described above) for identifying and connection to a wireless signal source correlated to the location/orientation of the mobile device 102 in the signal map 508, and/or performs a general scan for a wireless signal source. For example, if the handover to the target signal source is not successful, the connectivity module 108 can implement the method 1500 for obtaining wireless connectivity. Further, a probability score 1312 for the location of the mobile device and/or the target signal source may be decreased to reflect the unsuccessful handover.

In at least one implementation, at 1614 a disconnect from a current wireless signal source is performed in conjunction with the identification and connection to an available wireless signal source. The connectivity module 108, for instance, causes a current connection to a wireless signal source to be dropped, such as by implementing an intentional radio link failure for a current wireless signal source. The mobile device 102 can then establish a new connection to an optimal signal source identified at 1612.

Returning to 1604, if the target signal source does not meet the signal threshold ("No"), at 1616 the wireless handover to the target signal source is not implemented. The connectivity module 108, for instance, does not proceed with the wireless handover. The method can then proceed to 1612 to disconnect from a current wireless signal source and connect to an available optimal wireless signal source, as described above.

At 1618 the signal map is updated based on the result of the handover and/or the scan for an available wireless signal source. The connectivity module 108, for instance, updates a probability score for the location of the mobile device 102 and/or for a wireless signal source in the signal map 508. This can include creating a new entry for a wireless signal source, and/or updating an existing entry.

Thus, implementations of optimal device position for wireless communication include ways for utilizing a signal map of wireless signal attributes at different locations and device orientations to make decisions regarding wireless connectivity.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 17:
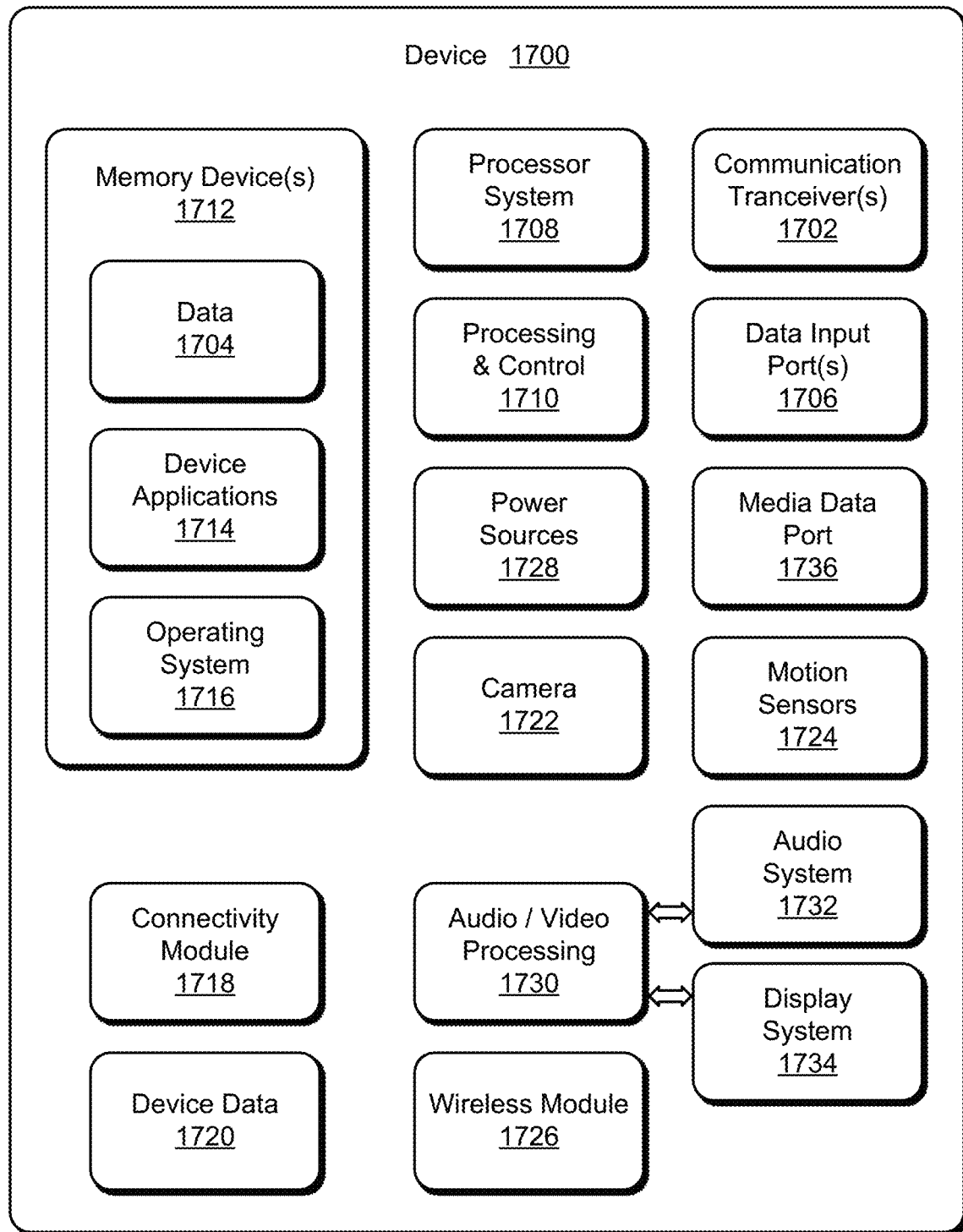
FIG. 17 illustrates various components of an example device that can implement aspects of optimal device position for wireless communication.

FIG. 17 illustrates various components of an example device 1700 in which aspects of optimal device position for wireless communication can be implemented. The example device 1700 can be implemented as any of the devices described with reference to the previous FIGS. 1-16, such as any type of mobile device, mobile phone, mobile device, wearable device, tablet, computing, communication, entertainment, gaming, media playback, and/or other type of electronic device. For example, the mobile device 102 as shown and described with reference to FIGS. 1-16 may be implemented as the example device 1700. In a wearable device implementation, the device may include any one or combination of a watch, armband, wristband, bracelet, glove or pair of gloves, glasses, jewelry items, clothing items, any type of footwear or headwear, and/or other types of wearables.

The device 1700 includes communication transceivers 1702 that enable wired and/or wireless communication of data 1704 with other devices. The data 1704 can include any of device identifying data, device location data, wireless connectivity data, and wireless protocol data. Additionally, the data 1704 can include any type of audio, video, and/or image data. Example communication transceivers 1702 include wireless personal area network (WPAN) radios compliant with various IEEE 1702.15 (Bluetooth™) standards, wireless local area network (WLAN) radios compliant with any of the various IEEE 1702.11 (Wi-Fi™) standards, wireless wide area network (WWAN) radios for cellular phone communication, wireless metropolitan area network (WMAN) radios compliant with various IEEE 1702.16 (WiMAX™) standards, and wired local area network (LAN) Ethernet transceivers for network data communication.

The device 1700 may also include one or more data input ports 1706 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1700 includes a processing system 1708 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1710. The device 1700 may further include any type of a system bus or other data and command transfer system that couples the various components within the device. A system bus can include any one or combination of different bus structures and architectures, as well as control and data lines.

The device 1700 also includes computer-readable storage memory 1712 (e.g., memory devices) that enable data storage, such as data storage devices that can be accessed by a computing device, and that provide persistent storage of data and executable instructions (e.g., software applications, programs, functions, and the like). Examples of the computer-readable storage memory 1712 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1700 may also include a mass storage media device.

The computer-readable storage memory 1712 provides data storage mechanisms to store the data 1704, other types of information and/or data, and various device applications 1714 (e.g., software applications). For example, an operating system 1716 can be maintained as software instructions with a memory device and executed by the processing system 1708. The device applications may also include a device manager, such as any form of a control application, software application, signal-processing and control module, code that is native to a particular device, a hardware abstraction layer for a particular device, and so on. Computer-readable storage memory 1712 represents media and/or devices that enable persistent and/or non-transitory storage of information in contrast to mere signal transmission, carrier waves, or signals per se. Computer-readable storage memory 1712 do not include signals per se or transitory signals.

In this example, the device 1700 includes a connectivity module 1718 that implements aspects of optimal device position for wireless communication, and may be implemented with hardware components and/or in software as one of the device applications 1714, such as when the device 1700 is implemented as the mobile device 102. An example, the connectivity module 1718 can be implemented as the connectivity module 108 described in detail above. In implementations, the connectivity module 1718 may include independent processing, memory, and logic components as a computing and/or electronic device integrated with the device 1700. The device 1700 also includes device data 1720 for implementing aspects of optimal device position for wireless communication, and may include data from the connectivity module 108.

In this example, the example device 1700 also includes a camera 1722 and motion sensors 1724, such as may be implemented in an inertial measurement unit (IMU). The motion sensors 1724 can be implemented with various sensors, such as a gyroscope, an accelerometer, and/or other types of motion sensors to sense motion of the device. The various motion sensors 1724 may also be implemented as components of an inertial measurement unit in the device.

The device 1700 also includes a wireless module 1726, which is representative of functionality to perform various wireless communication tasks. For instance, for the mobile device 102, the wireless module 1726 can be leveraged to scan for and detect wireless networks, as well as negotiate wireless connectivity to wireless networks for the mobile device 102. The device 1700 can also include one or more power sources 1728, such as when the device is implemented as a mobile device. The power sources 1728 may include a charging and/or power system, and can be implemented as a flexible strip battery, a rechargeable battery, a charged super-capacitor, and/or any other type of active or passive power source. Generally, utilizing implementations of optimal device position for wireless communication enables the power sources 1728 to be conserved as part of a wireless network connectivity process.

The device 1700 also includes an audio and/or video processing system 830 that generates audio data for an audio system 1732 and/or generates display data for a display system 34. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 836. In implementations, the audio system and/or the display system are integrated components of the example device. Alternatively, the audio system and/or the display system are external, peripheral components to the example device.

Although implementations of optimal device position for wireless communication have been described in language specific to features and/or methods, the subject of the appended claims is not necessarily limited to the specific features or methods described. Rather, the features and methods are disclosed as example implementations of optimal device position for wireless communication, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, comprising: collecting position data and wireless signal data pertaining to a mobile device; processing the wireless signal data and the position data to identify an optimal position of the mobile device with an optimum wireless signal quality; implementing an optimization process to enable the mobile device to be positioned at the optimal position; and causing the mobile device to participate in wireless signal communication while positioned at the optimal position.

Alternatively or in addition to the above described method, any one or combination of: wherein said collecting position data and wireless signal data occurs based on detecting a calibration event indicating that the mobile device is to be dynamically calibrated for optimum wireless performance; wherein said collecting position data and wireless signal data occurs based on detecting a calibration event indicating that the mobile device is to be calibrated for optimum wireless performance, and wherein the method further comprises presenting a user prompt with guidance for enabling a user to assist in a calibration process; wherein said collecting position data and wireless signal data occurs at a particular location of the mobile device, and wherein the position data indicates different 3D orientations of the mobile device at the particular location; wherein said collecting position data and wireless signal data identifies different discrete 3D orientations of the mobile device, and wireless signal attributes of wireless signal detected at the different discrete 3D orientations; wherein the wireless signal attributes further identify different antennas of the mobile device, and wireless signal attributes of wireless signal at each of the different antennas for the different 3D orientations; wherein said collecting position data and wireless signal data identifies different discrete 3D orientations of the mobile device, and wireless signal attributes of wireless signal detected at the different discrete 3D orientations, and wherein said processing the wireless signal data and position data comprises: determining, based on the wireless signal attributes, wireless signal attributes at each of the different discrete 3D orientations; and specifying the 3D orientation with an optimal wireless signal as the optimal position of the mobile device; further comprising generating a signal map that identifies the different 3D orientations and wireless signal attributes at each 3D orientation; further comprising determining that a physical obstruction is present at a particular 3D orientation of the mobile device, and wherein said determining the signal attributes at the particular 3D orientation further comprises adjusting a confidence score assigned to the signal attributes at the particular 3D orientation to compensate for the physical obstruction; wherein said implementing an optimization process comprises presenting a user prompt with guidance for positioning the mobile device at the optimal position; further comprising placing a task to be performed on the mobile device into a task queue, and causing the task to be performed based on detecting the mobile device is positioned at the optimal position.

A mobile device comprising: a wireless radio system to transmit and receive wireless signal; a sensor system; and a wireless module implemented to: collect position data from the sensor system and wireless signal data from the wireless radio system; process the wireless signal data and the position data to identify wireless signal attributes experienced at the mobile device at multiple different positions; identify, from the multiple different positions, an optimal position of the mobile device with optimum wireless signal attributes; implement an optimization process to cause the mobile device to be positioned at the optimal position; and cause the mobile device to participate in wireless signal communication while positioned at the optimal position.

Alternatively or in addition to the above described mobile device, any one or combination of: wherein the wireless radio system includes multiple different antennas, and wherein the wireless module is further implemented to collect the wireless signal data from the multiple different antennas and to specify from which antenna instances of the wireless signal data is received; wherein the wireless radio system includes multiple different antennas, and wherein the wireless module is further implemented to collect the wireless signal data from the multiple different antennas and to specify wireless signal attributes at each individual antenna; wherein the wireless module is further implemented to generate a signal map that identifies the multiple different positions, and wireless signal attributes at each of the multiple different positions; wherein the wireless module is further implemented to detect a physical obstruction at a particular position of the multiple different positions, and to adjust a wireless signal attribute of wireless signal detected at the particular position to compensate for the detected obstruction, including adjusting a probability score applied to the wireless signal data.

A system comprising: one or more processors; and one or more computer-readable storage memory storing instructions that are executable by the one or more processors to perform operations including: determining that a mobile device is located at a particular location; accessing a wireless coverage map for the particular location to identify an optimal position of the mobile device for optimal wireless performance at the particular location; implementing an optimization process to cause the mobile device to be positioned at the optimal position; and causing the mobile device to participate in wireless signal communication while positioned at the optimal position.

Alternatively or in addition to the above described system, any one or combination of: wherein wireless coverage map is based on a particular geographic location, and specifies wireless signal attributes at multiple different device orientations at the particular geographic location; wherein said implementing the optimization process comprises outputting an optimization notification that provides instructions for placing the mobile device at the optimal position; wherein the operations further include: placing a wireless task to be performed on the mobile device into a task queue; and causing the wireless task to be performed in response to detecting that the mobile device is positioned at the optimal position.

The invention claimed is:

1. A method, comprising:
   initiating a calibration process to calibrate wireless signal of a mobile device, the calibration process including presenting a user prompt requesting a user to assist in obtaining a position of the mobile device that exhibits an optimum wireless signal by manipulating the mobile device to multiple different positions;
   responsive to receiving user manipulation of the mobile device to the multiple different positions, collecting position data and wireless signal data pertaining to the mobile device at each of the multiple different positions of the mobile device, including identifying each antenna of multiple different antennas that are installed on the mobile device, and one or more wireless signal attributes of each antenna at each of the multiple different positions of the mobile device;
   determining that a physical obstruction is present at a particular position of the multiple different positions and adjusting one or more wireless signal attributes for the particular position to compensate for the physical obstruction;
   processing the wireless signal data and the position data to identify the position of the multiple different positions of the mobile device that exhibits the optimum wireless signal and an antenna of the multiple different antennas installed on the mobile device that exhibits a best wireless signal at the position, the optimum wireless signal representing wireless signal from among the multiple different positions with one or more of a highest signal strength or a highest wireless signal quality;
   implementing an optimization process to enable the mobile device to be positioned at the position; and
   causing the mobile device to participate in wireless signal communication while positioned at the position.

2. The method as recited in claim 1, wherein said initiating a calibration process occurs based on detecting a calibration event indicating that the mobile device is to be dynamically calibrated for optimum wireless performance.

3. The method as recited in claim 1, wherein said collecting position data and wireless signal data occurs at a particular physical location of the mobile device, and wherein the position data indicates different 3D orientations of the mobile device at the particular physical location.

4. The method as recited in claim 1, further comprising generating a signal map that identifies the multiple different positions and the wireless signal attributes experienced at each of the multiple different positions.

5. The method as recited in claim 1, wherein said implementing an optimization process comprises presenting an additional user prompt with guidance for positioning the mobile device at the position.

6. The method as recited in claim 1, further comprising placing a task to be performed on the mobile device into a task queue, and causing the task to be performed based on detecting the mobile device is positioned at the position.

7. The method as recited in claim 6, wherein said placing the task into the task queue occurs based on determining that the mobile device is positioned away from the position.

8. The method as recited in claim 1, wherein said identifying the position of the multiple different positions of the mobile device that exhibits the optimum wireless signal further comprises identifying which antenna of the multiple different antennas exhibits a highest combination of signal strength and signal quality at the position.

9. A mobile device comprising:
   a wireless radio system including multiple different antennas installed on the mobile device to transmit and receive wireless signal;
   a sensor system; and
   a wireless module implemented to:
      initiate a calibration process to calibrate wireless signal of the mobile device, the calibration process including to cause presentation of a user prompt that requests a user to manipulate the mobile device to multiple different positions to assist in acquisition of a position that exhibits optimum wireless signal attributes;
      collect position data from the sensor system and wireless signal data from the wireless radio system at each of the multiple different positions responsive to user manipulation of the mobile device to the multiple different positions being received;
      process the wireless signal data and the position data to identify wireless signal attributes experienced at the mobile device at each of the multiple different positions, including one or more wireless signal attributes of each antenna of the multiple different antennas installed on the mobile device at each of the multiple different positions;

detect a physical obstruction at a particular position of the multiple different positions and adjust the wireless signal attributes identified at the particular position to compensate for the detected physical obstruction;

identify, from the multiple different positions, the position of the mobile device that exhibits the optimum wireless signal attributes, the optimum wireless signal attributes based on one or more of a highest wireless signal strength or a highest wireless signal quality from among the multiple different positions;

implement an optimization process to cause the mobile device to be positioned at the position; and cause the mobile device to participate in wireless signal communication while positioned at the position.

10. The mobile device as recited in claim 9, wherein the wireless module is further implemented to collect the wireless signal data from the multiple different antennas and to specify from which antenna instances of the wireless signal data is received.

11. The mobile device as recited in claim 9, wherein the wireless module is further implemented to collect the wireless signal data from the multiple different antennas and to specify the one or more wireless signal attributes at each individual antenna.

12. The mobile device as recited in claim 9, wherein the wireless module is further implemented to generate a signal map that identifies the multiple different positions, and the wireless signal attributes at each of the multiple different positions.

13. The mobile device as recited in claim 9, wherein the wireless module is further implemented to identify which antenna of the multiple different antennas exhibits a highest combination of signal strength and signal quality at the position.

14. The mobile device as recited in claim 9, wherein the wireless module is further implemented to place a task to be performed on the mobile device into a task queue responsive to a determination that the mobile device is positioned away from the position.

15. The mobile device as recited in claim 14, wherein the wireless module is further implemented to cause the task to be performed based on detection of the mobile device at the position.

16. The mobile device as recited in claim 9, wherein the optimization process causes presentation of an additional user prompt that provides instructions to position the mobile device at the position.

17. A system comprising:
one or more processors; and
one or more computer-readable storage memory storing instructions that are executable by the one or more processors to perform operations including:
initiating a calibration process to calibrate wireless signal of a mobile device, the calibration process including presenting a user prompt requesting a user to assist in obtaining a position of the mobile device that exhibits an optimum wireless signal by manipulating the mobile device to multiple different positions;

responsive to receiving user manipulation of the mobile device to the multiple different positions, collecting position data and wireless signal data pertaining to the mobile device at each of the multiple different positions of the mobile device, including identifying each antenna of multiple different antennas that are installed on the mobile device, and one or more wireless signal attributes of each antenna at each of the multiple different positions of the mobile device;

determining that a physical obstruction is present at a particular position of the multiple different positions and adjusting one or more wireless signal attributes for the particular position to compensate for the physical obstruction;

processing the wireless signal data and the position data to identify the position of the multiple different positions of the mobile device that exhibits the optimum wireless signal and an antenna of the multiple different antennas installed on the mobile device that exhibits a best wireless signal at the position, the optimum wireless signal representing wireless signal from among the multiple different positions with one or more of a highest signal strength or a highest wireless signal quality;

implementing an optimization process to enable the mobile device to be positioned at the position; and causing the mobile device to participate in wireless signal communication while positioned at the position.

18. The system as recited in claim 17, wherein said initiating a calibration process occurs based on detecting a calibration event indicating that the mobile device is to be dynamically calibrated for optimum wireless performance.

19. The system as recited in claim 17, wherein said implementing an optimization process comprises presenting an additional user prompt with guidance for positioning the mobile device at the position.

20. The system as recited in claim 17, wherein the operations further include placing a task to be performed on the mobile device into a task queue, and causing the task to be performed based on detecting the mobile device is positioned at the position.

* * * * *